(12) United States Patent
Morita

(10) Patent No.: US 11,995,926 B2
(45) Date of Patent: May 28, 2024

(54) RECORDING CONTROL DEVICE, RECORDING CONTROL METHOD, AND COMPUTER-READABLE STORAGE MEDIUM

(71) Applicant: JVCKENWOOD Corporation, Yokohama (JP)

(72) Inventor: Jun Morita, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 610 days.

(21) Appl. No.: 17/219,980

(22) Filed: Apr. 1, 2021

(65) Prior Publication Data
US 2021/0217258 A1  Jul. 15, 2021

Related U.S. Application Data

(63) Continuation of application No. PCT/JP2019/048456, filed on Dec. 11, 2019.

(30) Foreign Application Priority Data

Feb. 15, 2019 (JP) .................................. 2019-025030
Mar. 13, 2019 (JP) .................................. 2019-045865
(Continued)

(51) Int. Cl.
G07C 5/08 (2006.01)
B60L 58/12 (2019.01)
(Continued)

(52) U.S. Cl.
CPC ............ G07C 5/0866 (2013.01); B60L 58/12 (2019.02)

(58) Field of Classification Search
CPC ...... G07C 5/0866; G07C 5/008; G07C 5/085; B60L 58/12; G08B 13/19676;
(Continued)

(56) References Cited

U.S. PATENT DOCUMENTS

2018/0308293 A1* 10/2018 DeCia .................... H04N 7/181

FOREIGN PATENT DOCUMENTS

EP 2141043 1/2010
JP 2008-186394 8/2008
(Continued)

OTHER PUBLICATIONS

JP-2011090645-A Translation (Year: 2011).*
JP-2009042095-A Translation (Year: 2009).*
JP-2016082677-A (Year: 2016).*
Extended European Search Report for European Patent Application No. 19915461.8 dated Nov. 29, 2021.
International Search Report and Written Opinion for International Application No. PCT/JP2019/048456 dated Jan. 28, 2020, 10 pages.

*Primary Examiner* — Kenneth J Malkowski
*Assistant Examiner* — Ibrahim Abdoalatif Alsomairy
(74) *Attorney, Agent, or Firm* — Amin, Turocy & Watson, LLP

(57) ABSTRACT

A recording control device includes a parking detection unit configured to detect a vehicle being parked; an event detection unit configured to detect an event related to the vehicle; a power supply state detection unit configured to detect a state of a power supply of the vehicle; and a recording control unit configured to, when the vehicle is parked, based on the state of the power supply of the vehicle, switch between first parking recording and second parking recording to be executed. The first parking recording is of starting recording the imaging data in response to detection of an event and saving the recorded imaging data as event recording data. The second parking recording is of keeping recording imaging data acquired from a camera and, in response to detection of an event, saving imaging data before and after detection of the event from the imaging data as event recording data.

3 Claims, 23 Drawing Sheets

(30) Foreign Application Priority Data

Mar. 13, 2019 (JP) .................................. 2019-046101
Mar. 14, 2019 (JP) .................................. 2019-047144

(51) Int. Cl.
*G08B 13/196* (2006.01)
*H04N 7/18* (2006.01)

(58) Field of Classification Search
CPC .......... G08B 13/19669; G08B 13/1965; G08B
13/19695; Y02T 10/70; H04N 5/772;
H04N 5/91; H04N 9/8205; H04N 7/188
See application file for complete search history.

(56) References Cited

FOREIGN PATENT DOCUMENTS

| | | | |
|---|---|---|---|
| JP | 2009042095 A | * | 2/2009 |
| JP | 2011-090645 | | 5/2011 |
| JP | 2011090645 A | * | 5/2011 |
| JP | 2013-257883 | | 12/2013 |
| JP | 2015-135677 | | 7/2015 |
| JP | 2016082677 A | * | 5/2016 |
| JP | 2017-102918 | | 6/2017 |
| WO | 2013/111184 | | 8/2013 |

* cited by examiner

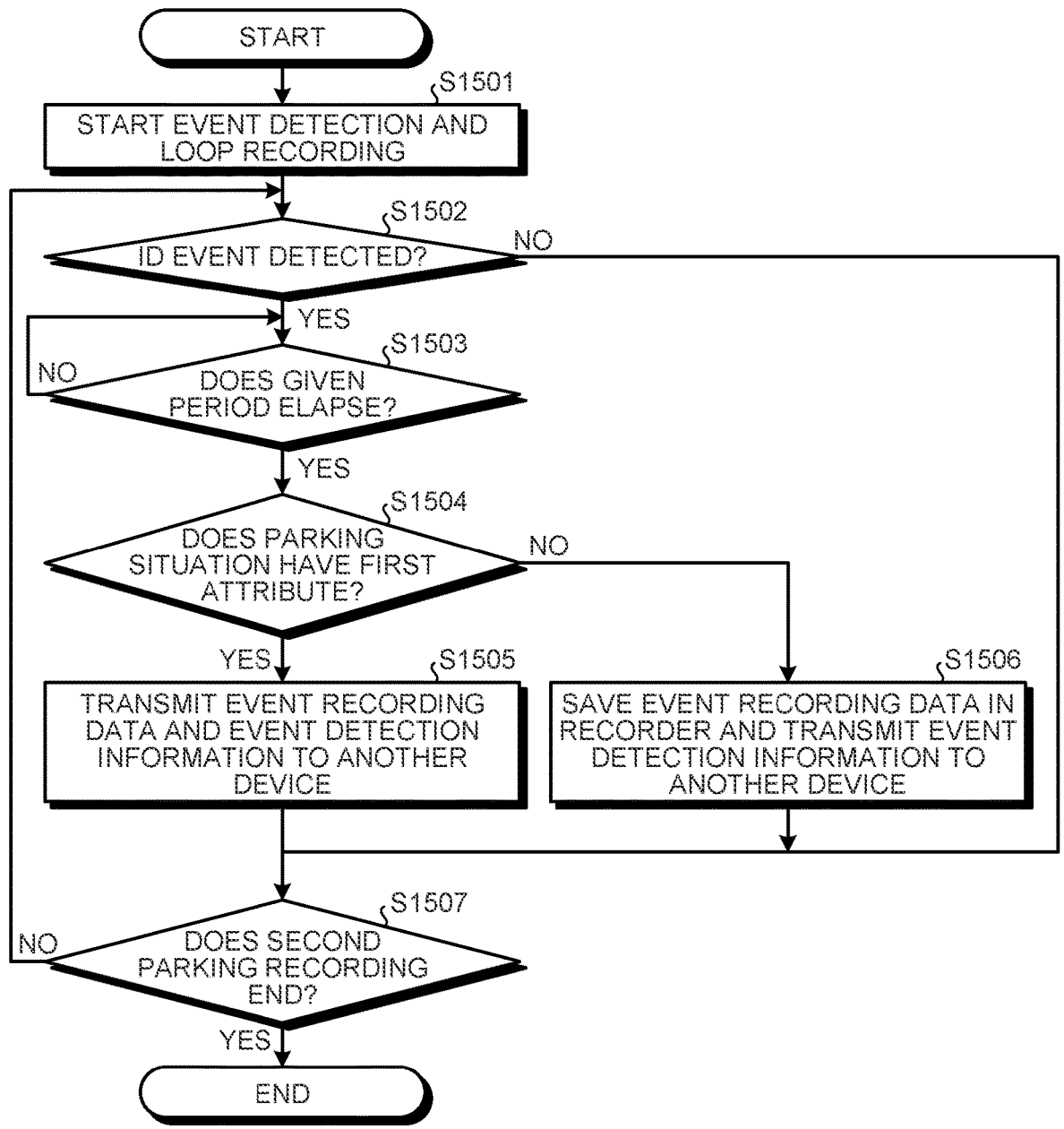

RECORDING CONTROL DEVICE, RECORDING CONTROL METHOD, AND COMPUTER-READABLE STORAGE MEDIUM

CROSS-REFERENCE TO RELATED APPLICATION

This application is a Continuation of PCT International Application No. PCT/JP2019/048456 filed on Dec. 11, 2019 which claims the benefit of priority from Japanese Patent Applications No. 2019-025030 filed on Feb. 15, 2019; No. 2019-045865 filed on Mar. 13, 2019; No. 2019-046101 filed on Mar. 13, 2019; and No. 2019-047144 filed on Mar. 14, 2019, the entire contents of all of which are incorporated herein by reference.

BACKGROUND

1. Technical Field

The disclosure relates to a recording control device, a recording control method, and a computer-readable storage medium.

2. Description of the Related Art

A dashboard camera has a parking monitoring mode of recording a video based on an event during parking as a mode of recording a video. When a parked vehicle is monitored by using power of a battery that the dashboard camera includes, or the like, power is sometimes supplied from a battery of the vehicle to the dashboard camera because it is not possible to perform monitoring for a long time with the capacity of the battery of the dashboard camera.

For example, Japanese Laid-open Patent Publication No. 2015-135677 discloses a device that activates a camera function on detection of a person when a battery for driving a vehicle is available, for example, when an electric vehicle is being charged.

A parking monitoring function is required to be activated even during charging without charging of the electric vehicle. When the vehicle is a so-called electric car or a plug-in hybrid car including an electric drive system, however, the parking monitoring function shortens the cruising distance of the vehicle if the dashboard camera keeps shooting while the vehicle is parked.

SUMMARY

A recording control device according to an embodiment includes: an imaging data acquisition unit configured to acquire imaging data from a camera; a parking detection unit configured to detect that a vehicle is parked; an event detection unit configured to detect an event related to the vehicle; a power supply state detection unit configured to detect a state of a power supply of the vehicle; and a recording control unit configured to, when the vehicle is parked, based on the state of the power supply of the vehicle, switch between first parking recording and second parking recording to be executed. The first parking recording is of starting recording the imaging data in response to detection of an event and saving the recorded imaging data as event recording data. The second parking recording is of keeping recording the imaging data and, in response to detection of an event, saving imaging data before and after detection of the event from the imaging data as event recording data.

A recording control method according to an embodiment is executed by a recording control device. The recording control method includes: detecting that a vehicle is parked; detecting a state of a power supply of the vehicle; and switching, when the vehicle is parked, based on the state of the power supply of the vehicle, between first parking recording and second parking recording to be executed. The first parking recording is of starting recording the imaging data in response to detection of an event and saving the recorded imaging data as event recording data. The second parking recording is of keeping recording the imaging data and, in response to detection of an event, saving imaging data before and after detection of the event from the imaging data as event recording data.

A non-transitory computer-readable storage medium according to an embodiment contains a computer program causing a computer operating as a recording control device to execute: detecting that a vehicle is parked; detecting a state of a power supply of the vehicle; and switching, when the vehicle is parked, based on the state of the power supply of the vehicle, between first parking recording and second parking recording to be executed, the first parking recording being of starting recording the imaging data in response to detection of an event and saving the recorded imaging data as event recording data, the second parking recording being of keeping recording the imaging data and, in response to detection of an event, saving imaging data before and after detection of the event from the imaging data as event recording data.

BRIEF DESCRIPTION OF THE DRAWINGS

FIG. 23 is a flowchart illustrating an example of a flow of a process of second parking recording according to the tenth embodiment of the disclosure.

DETAILED DESCRIPTION

With reference to the accompanying drawings, an embodiment according to the disclosure will be described in detail below. The embodiment does not limit the disclosure and, when there are multiple embodiments, the disclosure includes one configured by combining the embodiments.

FIRST EMBODIMENT

Figure 1:
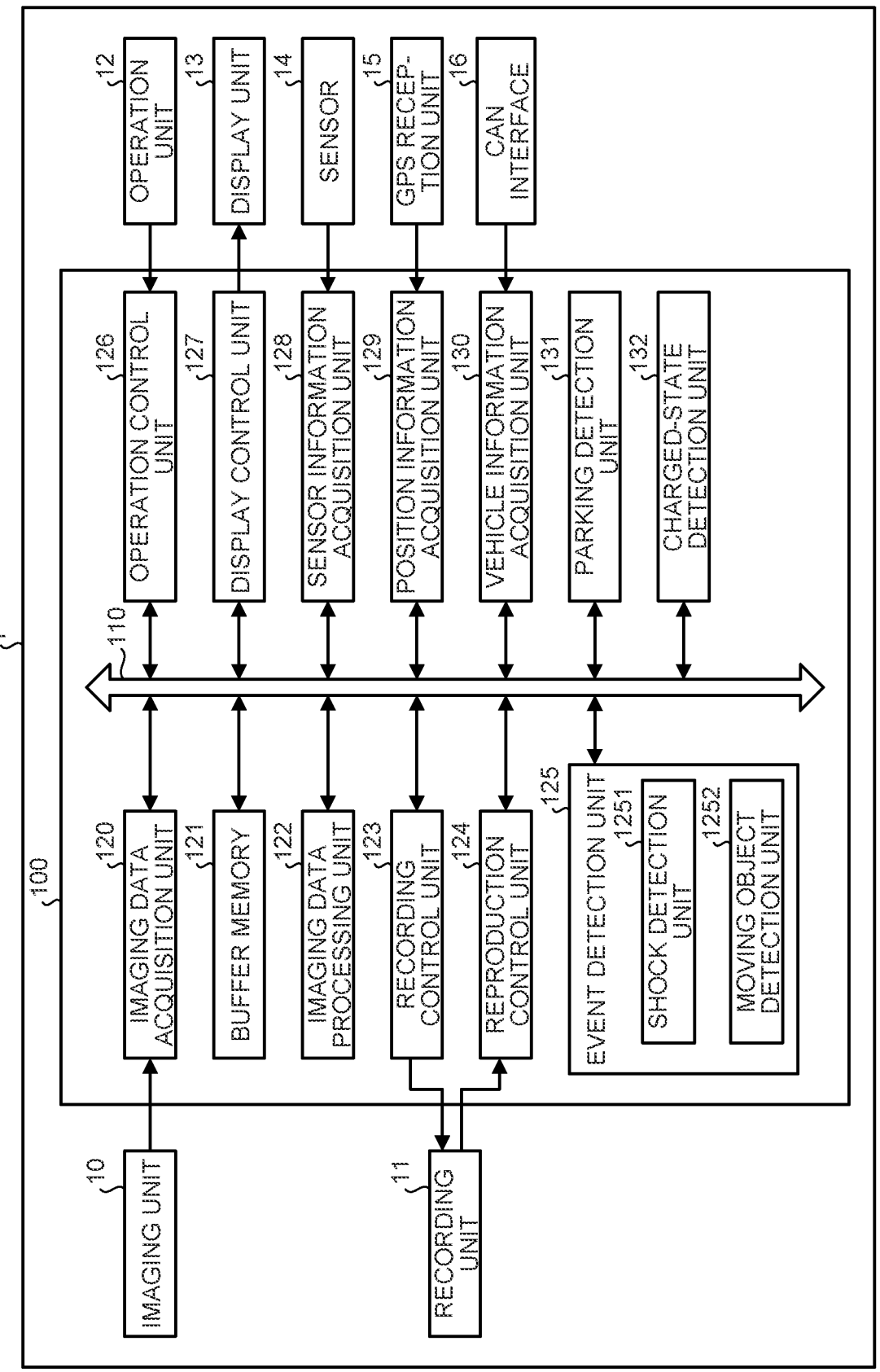
FIG. 1 is a block diagram illustrating an example of a configuration of a recording apparatus according to a first embodiment of the disclosure.

Using FIG. 1, a recording apparatus according to a first embodiment of the disclosure will be described. FIG. 1 is a block diagram illustrating an example of a configuration of the recording apparatus according to the first embodiment of the disclosure.

A recording apparatus 1 includes an imaging unit 10, a recording unit 11, an operation unit 12, a display unit 13, a sensor 14, a GPS reception unit 15, a control unit area network (CAN) interface 16, and a control unit (recording control device) 100. The recording apparatus 1 is installed in a vehicle with a battery mounted thereon, such as an electric car or a plugin hybrid car, and records, as event recording data, imaging data based on an event that is detected while the vehicle is parked. The recording apparatus 1 is not limited to an electric car and may be installed a bicycle or a motorcycle with two tires if the recording apparatus 1 includes a drive battery.

The imaging unit 10 is a camera that is used in a vehicle in which the recording apparatus 1 is installed and captures an image of a freely-selected area inside and outside the vehicle. The imaging unit 10 may be any one of or a combination of a camera that captures an image of the front of the vehicle, a camera that captures an image of the back of the vehicle, and a camera that captures the sides of the vehicle or may be a camera unit including multiple cameras to capture an image of the surroundings of the vehicle or a dome camera. The imaging unit 10 may include a camera that captures an image of the interior of the vehicle. The imaging unit 10 outputs imaging data captured by the camera that is used in the vehicle to an imaging data acquisition unit 120.

The recording unit 11 records various types of data, such as event recording data that is recoded when an event is detected. The recording unit 11, for example, saves imaging data of a given period based on detection of an event as event recording data. The recording unit 11, for example, records imaging data that is kept being captured while the vehicle is parked. The recording unit 11, for example, can be implemented by a semiconductor memory device, such as a random access memory (RAM) or a flash memory, or a storage device, such as a hard disk or a solid-state drive. The recording unit 11 may be configured of different multiple memories.

The operation unit 12 receives various operations on the control unit 100. The various operations include operations of starting reproduction of event recording data and stating saving event recording data. The operation unit 12 outputs an operation signal corresponding to a received operation to an operation control unit 126. The operation unit 12, for example, can be implemented by a physical switch or a touch panel that is provided in the display unit 13.

The display unit 13 displays various videos. The display unit 13, for example, displays the event recording data that the recording unit 11 records. The display unit 13, for example, is a display including a liquid crystal display (LCD) or an organic electro-luminescence (EL) display.

The sensor 14 detects various types of information resulting from occurrence of an event related to the vehicle. The sensor 14, for example, is an acceleration sensor and detects acceleration that is added to the vehicle. The sensor 14, for example, is a gyro sensor and detects information on the posture of the vehicle. The sensor 14 outputs a detection result to a sensor information acquisition unit 128.

The GPS reception unit 15 is configured of a GPS receiving circuit, a GPS receiving antenna, etc., and receives GPS signals. The GPS reception unit 15 outputs the received GPS signals to a position information acquisition unit 129.

The CAN interface 16 is an interface for acquiring various types of vehicle information via a CAN. The vehicle information, for example, contains information on the operating condition of the engine and the traveling condition of the vehicle.

The control unit 100 includes the imaging data acquisition unit 120, a buffer memory 121, an imaging data processing unit 122, a recording control unit 123, a reproduction control unit 124, an event detection unit 125, the operation control unit 126, a display control unit 127, the sensor information acquisition unit 128, the position information acquisition unit 129, a vehicle information acquisition unit 130, a parking detection unit 131, and a charged-state detection unit 132. The control unit 100, for example, can be implemented by an electric circuit including a central processing unit (CPU) and a program for implementing each unit of the control unit 100 is stored in an internal memory that the CPU includes. In this case, the control unit 100 implements the function of each unit by loading the program that is stored in the internal memory and executing the program. In FIG. 1, the units implemented by the control unit 100 is illustrated as being connected with one another via a bus 110 for easy understanding.

The imaging data acquisition unit 120 acquires various types of imaging data from the outside. The imaging data acquisition unit 120, for example, acquires the imaging data that is captured by the imaging unit 10 from the imaging unit 10. The imaging data acquisition unit 120, for example, outputs the imaging data that is acquired from the imaging unit 10 to the buffer memory 121 and the display control unit 127. The imaging data acquisition unit 120 may acquire video data that is captured by the imaging unit 10 as imaging data or may acquire, in addition to the video data, imaging data containing audio data that is acquired by a microphone that is arranged in the imaging unit 10 or another position and that is not illustrated in the drawing.

The buffer memory 121 is an internal memory of the control unit 100 that temporarily stores the imaging data that is acquired by the imaging data acquisition unit 120. Specifically, the buffer memory 121 temporarily stores imaging data of a certain duration that is acquired by the imaging data acquisition unit 120 while updating the imaging data.

The imaging data processing unit 122 executes various types of processing on the imaging data that the buffer memory 121 stores temporarily. The imaging data acquisition unit 120, for example, converts the imaging data that the buffer memory 121 stores temporarily into a freely-selected file format, such as the MP4 format. The imaging data processing unit 122, for example, generates imaging data of a data file of the certain duration from the imaging data that the buffer memory 121 stores temporarily. Specifically, the imaging data processing unit 122 generates imaging data of 60 seconds as a data file from the imaging data that the buffer memory 121 stores temporarily. The imaging data processing unit 122 outputs the generated imaging data to the recording control unit 123. The imaging data processing unit 122 outputs the generated imaging data to the display control unit 127. The period of the imaging data that is generated as the data file is 60 seconds as an example but is not limited thereto.

The recording control unit 123 records various types of data in the recording unit 11. The recording control unit 123, for example, performs control to cause the recording unit 11 to record the imaging data that is converted into a file by the imaging data processing unit 122.

Specifically, the recording control unit 123 changes the process of recording control according to whether the battery of the vehicle is being charged. Specifically, when the vehicle is parked and the battery of the vehicle is not being charged, the recording control unit 123 performs first parking recording of starting recording imaging data in response to detection of an event and saving the imaging data of a given period as recording data. When the vehicle is parked and is being charged, the recording control unit 123 performs second parking recording of keeping recording imaging data and saving imaging data of given periods before and after detection of an event in response to detection of the event.

When information on the remaining capacity of the battery of the vehicle is received, the recording control unit 123 may change the process of recording control according to the remaining capacity of the battery. Specifically, the recording control unit 123 performs the first parking recording when the vehicle is parked and is being charged and the remaining capacity of the battery of the vehicle is under a given capacity. The recording control unit 123 performs the second parking recording when the vehicle is parked and is being charged and the remaining capacity of the battery of the vehicle is at or above the given capacity. The given capacity is, for example, 25% to 0% of the full capacity of the battery but is not limited thereto. The given capacity may be set freely by the user. The given capacity may be set based on a travel record of the user. For example, when it is determined that charging is unnecessary for few days based on the travel record of the user, the second parking recording may be performed.

While the battery is charged, the recording control unit 123 may change the process of recording control according to the rate of charging the battery. The recording control unit 123, for example, may perform the first parking recording when charging is performed at a normal rate. The recording control unit 123, for example, may perform the second parking recording when the battery is being charged rapidly at an electric charge station enabling rapid charging.

The reproduction control unit 124 reproduces various types of data that is recorded in the recording unit 11. The reproduction control unit 124, for example, reproduces the imaging data that is recorded as the data file in the recording unit 11. The reproduction control unit 124, for example, reproduces event recording data that is saved in the recording unit 11. The reproduction control unit 124, for example, reproduces the event recording data in the first parking recording that is recorded by the recording control unit 123. The reproduction control unit 124, for example, reproduces the event recording data in the second parking recording that is recorded by the recording control unit 123. Specifically, the reproduction control unit 124, for example, reproduces freely-selected imaging data according to a control signal that corresponds to an operation on the operation unit 12 and that is output from the operation control unit 126.

The event detection unit 125 receives a detection result from the sensor 14. The event detection unit 125, for example, detects an event based on the received detection result. The event detection unit 125 acquires acceleration information on an acceleration as the detection result. In this case, the event detection unit 125 detects an event based on the acceleration information. On detecting an event, the event detection unit 125 outputs a control signal representing information indicating that an event has been detected to the recording control unit 123. The event detection unit includes a shock detection unit 1251 and a moving object detection unit 1252.

The shock detection unit 1251 detects, as a shock, acceleration at a crash of the vehicle into another object, such as another vehicle, that is received as the result of detection by the sensor 14 from the sensor information acquisition unit 128. The detection of acceleration corresponding to the shock may be weighted in each of an x-axis direction, a y-axis direction and a z-axis direction in the sensor 14 that is a three-axis acceleration sensor. In detection of acceleration corresponding to a shock, acceleration whose rise of acceleration is steep may be a subject to be detected.

The moving object detection unit 1252 detects whether there is a moving object from the imaging data that is acquired by the imaging data acquisition unit 120. The moving object detection unit 1252, for example, detects an area in which the luminance and color information per unit of pixel or per unit of few-pixels block varies in each frame in the imaging data. In this case, the moving object detection unit 1252 determines that a moving object is detected when a change over time is detected in an area equal to or larger than a given area. Note that the method by which the moving object detection unit 1252 detects a moving object is not limited thereto and a moving object may be detected by a known method.

The operation control unit 126 receives an operation signal on an operation that is received from the user from the operation unit 12. The operation control unit 126, for example, receives an operation signal on an operation of starting reproducing imaging data or starting recording imaging data. The operation control unit 126 outputs a control signal corresponding to the received operation signal to the recording control unit 123 or the reproduction control unit 124. In this case, the recording control unit 123 and the reproduction control unit 124 execute operations according to a control signal.

The display control unit 127 displays various videos on the display unit 13. Specifically, the display control unit 127 outputs a video signal to the display unit 13, thereby displaying a video on the display unit 13. The display control unit 127, for example, outputs a video signal on the imaging data that is recorded in the recording unit 11 to the display unit 13, thereby displaying the imaging data on the display unit 13.

The sensor information acquisition unit 128 acquires various detection results from the sensor 14. The sensor information acquisition unit 128 acquires, for example, the acceleration at a crash of the vehicle into another object, such as another vehicle, from the sensor 14. The sensor information acquisition unit 128 outputs the acquired detection results from the sensor 14 to the event detection unit 125.

The position information acquisition unit 129 receives GPS signals from the GPS reception unit 15. The position information acquisition unit 129 calculates current position information based on the GPS signals.

The vehicle information acquisition unit 130 acquires various types of vehicle information via the CAN from the CAN interface 16. The vehicle information acquisition unit 130 acquires, as the vehicle information, for example, information on operations of the engine of the vehicle, information on whether the battery is being charged, and information of operations of a power system of the vehicle, such as the remaining capacity of the battery. The vehicle information acquisition unit 130 outputs the acquired vehicle information to the parking detection unit 131 and the recording control unit 123.

The parking detection unit 131 detects that the vehicle is parked. Based on the vehicle information that is received from the vehicle information acquisition unit 130, the parking detection unit 131 detects a condition, such as the fact that a dynamic force of the engine of the vehicle, or the like, has been turned off, an accessory power supply has been turned off, the parking gear has been chosen, the parking brake has operated, or the current position of the vehicle represents a parking space. The parking detection unit 131 may detect a combination of various conditions. The parking detection unit 131 detects that the vehicle is parked based on the detected condition.

Based on the vehicle information that is received from the vehicle information acquisition unit 130, the charged-state detection unit 132 detects a charged state of the battery that drives the vehicle. The charged-state detection unit 132, for example, may acquire information on the charged state of the battery from a control circuit that controls discharge and charge of current or voltage of the battery that drives the vehicle. The charged-state detection unit 132 may be referred to as a power supply state detection unit.

Process of First Embodiment

Figure 2:
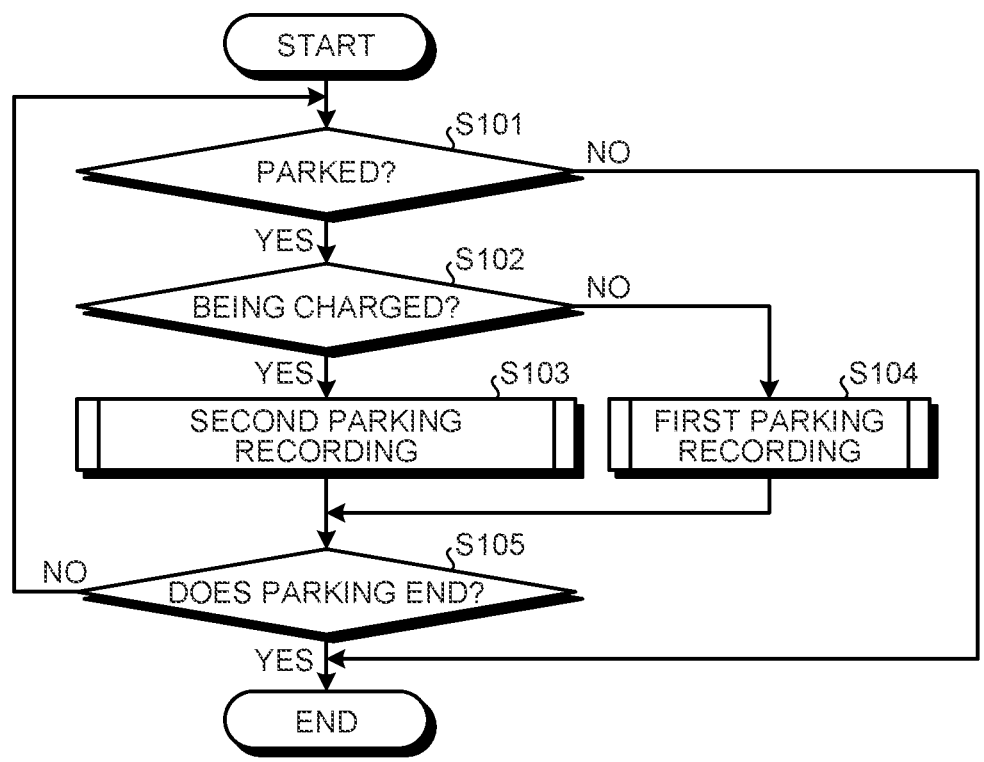
FIG. 2 is a flowchart illustrating an example of a flow of a process performed by a recording control device according to the first embodiment of the disclosure.

Using FIG. 2, a process performed by the control unit 100 of the recording apparatus 1 according to the first embodiment will be described. FIG. 2 is a flowchart illustrating an example of a flow of the process performed by the control unit 100.

First of all, the control unit 100 determines whether the vehicle is parked (step S101). When it is determined that the vehicle is parked (YES at step S101), the control unit 100 goes to step S102. On the other hand, when it is determined that the vehicle is not parked (NO at step S101), the control unit 100 ends the process in FIG. 2. In a period in which the process in FIG. 2 is not performed, the control unit 100 does not function as the parking monitoring mode but functions as a mode of detecting an event during an operation of the vehicle, such as a travel of the vehicle. The process in FIG. 2 may be started in response to detection of parking of the vehicle and may end in response to ending of parking of the vehicle.

At step S102, the control unit 100 determines whether the battery of the vehicle is being charged (step S102). When it is determined that the battery is being charged (YES at step S102), the control unit 100 goes to step S103. On the other hand, when it is determined that the battery is not being charged (NO at step S102), the control unit 100 goes to step S104.

At step S103, the control unit 100 starts the second parking recording (step S103). Details of the process of the second parking recording will be described below. The control unit 100 then goes to step S105.

At step S104, the control unit 100 starts the first parking recording (step S104) and details of the process of the first parking recording will be described below. The control unit 100 then goes to step S105.

At step S105, the control unit 100 determines whether the parking ends (step S105). Specifically, the control unit 100 determines whether the parking ends or the parking monitoring mode ends. When it is determined that the parking does not end (NO at step S105), the control unit 100 goes to step S101 and executes the above-described process. On the other hand, when it is determined that the parking ends (YES at step S105), the control unit 100 ends the process in FIG. 2.

Figure 3:
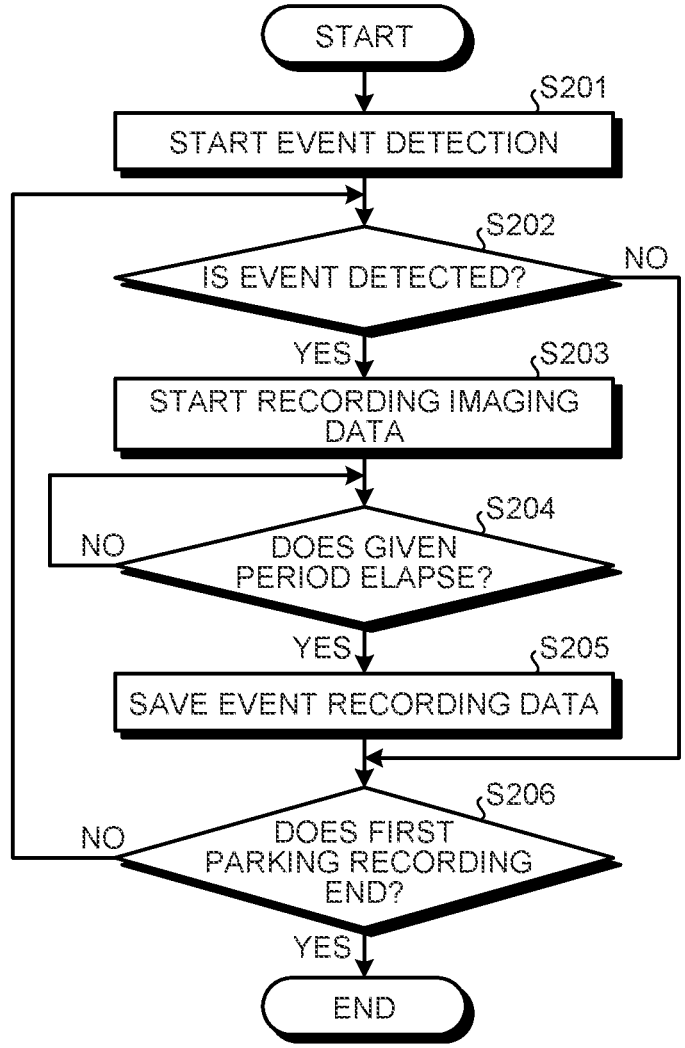
FIG. 3 is a flowchart illustrating an example of a flow of a process of first parking recording.

Using FIG. 3, the process of the first parking recording will be described. FIG. 3 is a flowchart illustrating an example of a flow of the process of the first parking recording.

First of all, the control unit 100 starts an event detection process performed by the event detection unit 125 (step S201). The control unit 100 then goes to step S202.

The control unit 100 determines whether an event is detected (step S202). When it is determined that an event is detected (YES at step S202), the control unit 100 goes to step S203. On the other hand, when it is determined that no event is detected (NO at step S202), the control unit 100 goes to step S206.

At step S203, the control unit 100 starts an operation of the imaging unit 10 and starts recording imaging data (step S203). The control unit 100 then goes to step S204.

The control unit 100 determines whether a given period elapses after detection of the event (step S204). When it is determined that the given period does not elapse (NO at step S204), the control unit 100 repeats the process of step S204. On the other hand, when it is determined that the given period elapses (YES at step S204), the control unit 100 goes to step S205.

After the given period elapses from the start of recording imaging data, the control unit 100 saves the imaging data of the given period as event recording data in the recording unit 11 (step S205). The control unit 100 then goes to step S206.

At step S206, the control unit 100 determines whether the first parking recording ends (S206). When it is determined that the first parking recording ends (YES at step S206), the control unit 100 ends the process in FIG. 3. On the other hand, when it is determined that that the first parking recording does not end (NO at step S206), the control unit 100 goes to step S202 and executes the above-described process.

Figure 4:
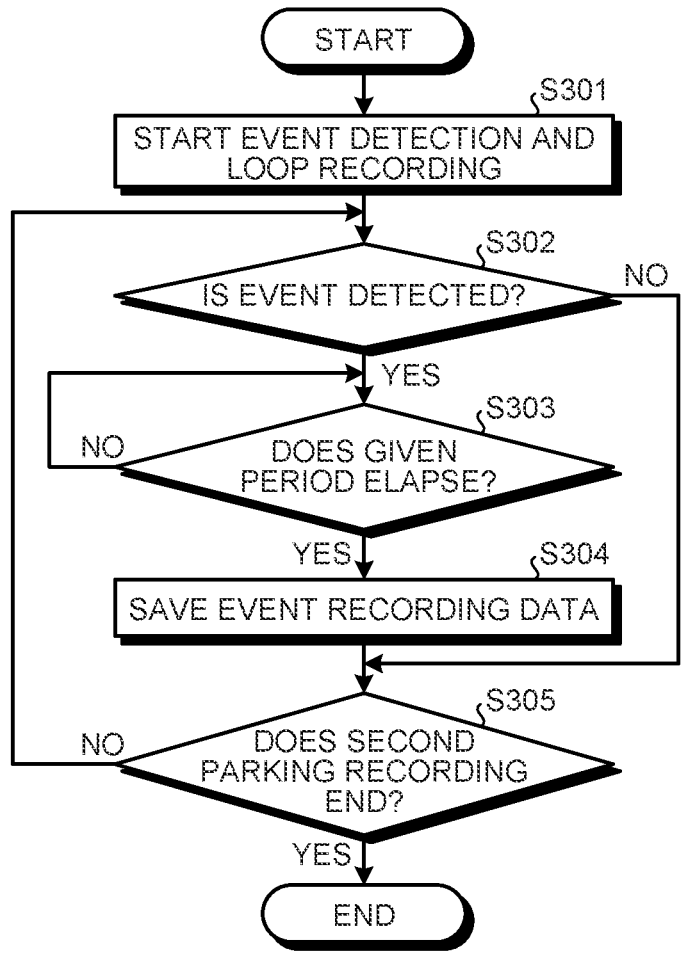
FIG. 4 is a flowchart illustrating an example of a flow of a process of second parking recording.

Using FIG. 4, the process of the second parking recording will be described. FIG. 4 is a flowchart illustrating an example of a flow of the process of the second parking recording.

First of all, the control unit 100 starts the event detection process performed by the event detection unit 125 and a process of loop recording of imaging data that is captured by the imaging unit 10 (step S301). The control unit 100 then goes to step S302.

The control unit 100 determines whether an event is detected (step S302). When it is determined that an event is detected (YES at step S302), the control unit 100 goes to step S303. On the other hand, when it is determined that no event is detected (NO step S302), the control unit 100 goes to step S305.

At step S303, the control unit 100 determines whether a given period elapses after detection of an event (step S303). When it is determined that the given period does not elapse (NO at step S303), the control unit 100 repeats the process of step S303. On the other hand, when it is determined that the given period elapses (YES at step S303), the control unit 100 goes to step S304.

Using the imaging data obtained by performing the loop recording process, the control unit 100 saves imaging data of given periods before and after detection of the event in the recording unit 11 as event recording data (step S304). The control unit 100 then goes to step S305.

At step S305, the control unit 100 determines whether the second parking recording ends (step S305). When it is determined that the second parking recording ends (YES at step S305), the control unit 100 ends the process in FIG. 4. On the other hand, when it is determined that the second parking recording does not end (NO at step S305), the control unit 100 goes to step S302 and executes the above-described process.

As described above, in the embodiment, it is possible to switch between the first parking recording of recording data at detection of an event and the second parking recording of keeping recording according to whether the battery is being charged while the vehicle is parked and save event recording data. As a result, in the embodiment, it is possible to appropriately record a video while the vehicle is parked. Specifically, recording is kept performed during charging, which makes it possible to record an event more assuredly. Recording after detection of an event when the battery is not charged makes it possible to record the event while reducing consumption of the battery.

In the embodiment, the process with a relatively greater power consumption of the battery is performed only when the battery is being charged. Thus, the process with a relatively greater power consumption of the battery is not performed when the battery is not being charged. This prevents the cruise distance of the vehicle from shortening because the power of the battery is consumed when the battery is not being charged.

Process of Second Embodiment

Figure 5:
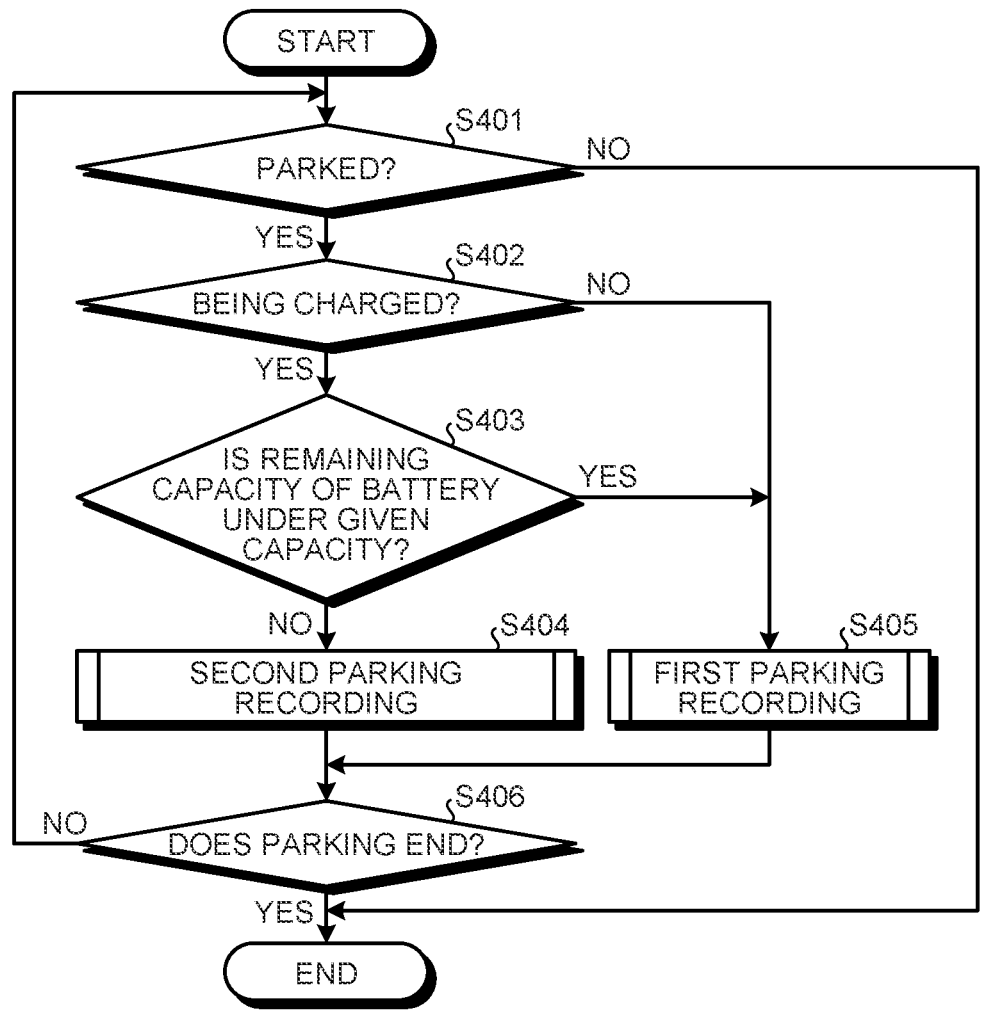
FIG. 5 is a flowchart illustrating an example of a flow of a process performed by a recording control device according to a second embodiment of the disclosure.

Using FIG. 5, a process performed by the control unit 100 according to a second embodiment will be described. FIG. 5 is a flowchart illustrating an example of a flow of the process performed by the control unit 100 according to the second embodiment. A configuration of the recording apparatus 1 according to the second embodiment is the same as the configuration of the recording process according to the first embodiment illustrated in FIG. 1 and thus description thereof is omitted.

The processes of step S401, step S402, and steps S404 to S406 are the same as the processes of step S101, step S102, and steps S103 to S105 illustrated in FIG. 2, respectively, respectively, and thus description thereof is omitted. The process illustrated in FIG. 5 is different from the process illustrated in FIG. 2 in switching between first parking recording and second parking recording according to the remaining capacity of the charge of the battery of the vehicle.

At step S402, when it is determined that charging is being performed (YES at step S402), the control unit 100 goes to step S403 and determines whether the remaining capacity of the battery is under a given capacity (step S403).

When it is determined that the remaining capacity of the battery is under the predetermined charge (YES at step S403), the control unit 100 goes to step S405. On the other hand, when the remaining capacity of the battery is at or above the given capacity (NO at step S403), the control unit 100 goes to step S404.

As described above, in the embodiment, in addition to determining whether the battery is being charged, it is possible to determine the remaining capacity of the battery, switch between the first parking recording and the second parking recording of keeping recording according to the remaining capacity of the battery, and save event recording data. As a result, in the embodiment, it is possible to record a video more appropriately while the vehicle is parked.

In the embodiment, even when the battery is being charged, a process of a relatively greater process is not performed when the remaining capacity of the battery is under the given capacity. As a result, in the embodiment, it is possible to prevent the duration for which the battery is charged from getting long.

THIRD EMBODIMENT

Figure 6:
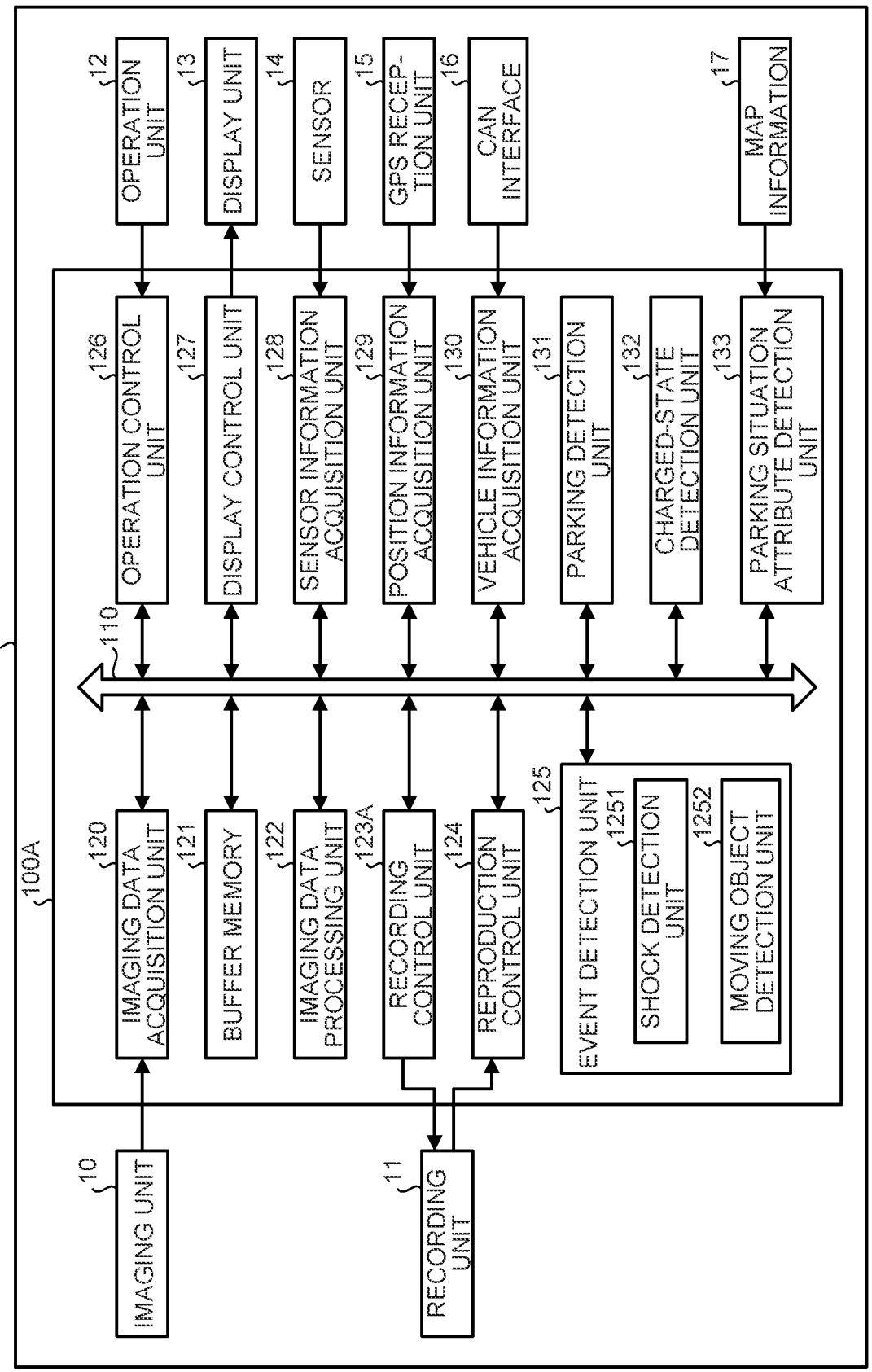
FIG. 6 is a block diagram illustrating an example of a configuration of a recording apparatus according to a third embodiment of the disclosure.

Using FIG. 6, a recording apparatus according to a third embodiment of the disclosure will be described. FIG. 6 is a block diagram illustrating an example of a configuration of the recording apparatus.

As illustrated in FIG. 6, a recording apparatus 1A is different from the recording apparatus 1 illustrated in FIG. 1 in that a control unit 100A includes a parking situation attribute detection unit 133.

In the embodiment, the parking detection unit 131 outputs a detection result indicating whether the vehicle is parked to the parking situation attribute detection unit 133.

The parking situation attribute detection unit 133 detects an attribute on the situation in which the vehicle is parked. The attribute on the parking situation means a site in which the vehicle is parked and information on duration for which the vehicle is parked. The parking situation attribute detection unit 133, for example, detects, as a first attribute, the fact that the site is a regular parking position and is a parking position in which the duration of parking is relatively long. The parking situation attribute detection unit 133, for example, detects, as a second attribute, the fact that the site is an irregular parking position and is a parking position in which the duration of parking is relatively short. The parking situation attribute detection unit 133 outputs an attribute detection result to a recording control unit 123A.

The parking situation attribute detection unit 133 detects a site in which the vehicle is parked based on the current position information that is calculated by the position information acquisition unit 129 and map information 17 that is input from the outside. The parking situation attribute detection unit 133 detects that the site in which the vehicle is currently parked is a regular parking position, such as a parking space at home, the place of employment, or the like. As for the site in which the vehicle is parked currently, the parking situation attribute detection unit 133 detects, as an irregular parking space, a parking space in which an electric charge station or a rapid electric charge station is arranged other than the regular parking position. A parking space in a commercial facility, a rest area, a dealer, or the like, can be exemplified as the irregular parking space; however, the irregular parking space is not limited thereto.

For example, when a camera or a sensor for monitoring vehicles is arranged at the gate of the parking lot or near the parking position, the parking situation attribute detection unit 133 may acquire information on the site in which the vehicle is parked from the camera or the sensor. For example, the parking situation attribute detection unit 133 may acquire the information from an electric charge station when the user inputs a member code to the electric charge station with a member card or a smartphone, thereby detecting that the current position is an irregular parking space.

The parking situation attribute detection unit 133 may determine a parking position based on the duration of parking. For example, in the case of a parking position in which the duration of parking is relatively long, the parking situation attribute detection unit 133 may determine that the parking position is a regular parking position. For example, in the case of a parking position in which the duration of parking is relatively short, the parking situation attribute detection unit 133 may determine that the parking position is an irregular parking position.

In the embodiment, the recording control unit 123A changes the recording process according to the attribute of the parking situation and the charged state of the battery. Details of recoding control will be described below.

Process of Third Embodiment

Figure 7:
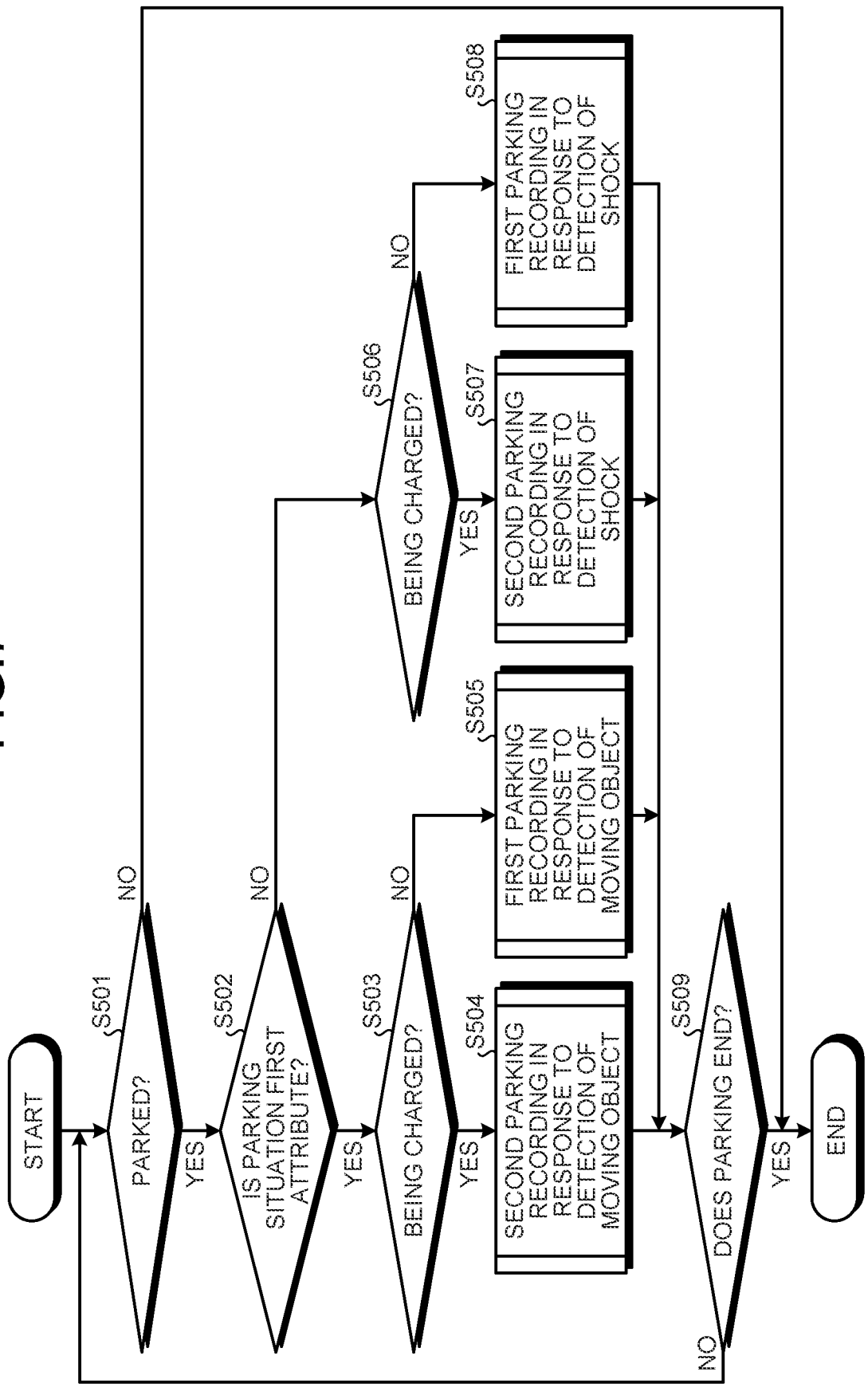
FIG. 7 is a flowchart illustrating an example of a flow of a process performed by a recording control device according to the third embodiment of the disclosure.

Using FIG. 7, a process performed by the control unit 100A of the recording apparatus 1A according to the third embodiment will be described. FIG. 7 is a flowchart illustrating an example of a flow of the process performed by the control unit 100A.

First of all, the control unit 100A determines whether a vehicle is parked (step S501). When it is determined that the vehicle is parked (YES at step S501), the control unit 100A goes to step S502. On the other hand, when it is determined that the vehicle is not parked (NO at step S501), the control unit 100A ends the process in FIG. 7.

The control unit 100A determines whether the situation in which the vehicle is parked has the first attribute (step S502). Specifically, at step S502, the control unit 100A determines whether the parking position is a regular parking space. When it is determined that the parking situation has the first attribute (YES at step S502), the control unit 100A goes to step S503. On the other hand, when it is determined that the parking situation does not have the first attribute (NO at step S502), the control unit 100A goes to step S506.

At step S503, the control unit 100A determines whether the battery of the vehicle is being charged (step S503). When it is determined that the battery is being charged (YES at step S503), the control unit 100A goes to step S504. On the other hand, when it is determined that the battery is not being charged (NO at step S503), the control unit 100A goes to step S505.

At step S504, the control unit 100A starts second parking recording in response to detection of a moving object (step S504). Specifically, at step S504, it is determined that an event occurs based on the fact that a moving object is detected by the moving object detection unit 1252 and imaging data of given periods before and after detection of the moving object is saved as event recording data in the recording unit 11. The control unit 100A then goes to step S509.

At step S505, the control unit 100A starts first parking recording in response to detection of a moving object (step S505). Specifically, at step S505, it is determined that an event occurs based on the fact that the moving object detection unit 1252 detects the moving object and, after a given period elapses from the start of recording imaging data after detection of the moving object, imaging data of the given period is saved as event recording data in the recording unit 11. The control unit 100A then goes to step S509.

At step S506, the control unit 100A determines whether the battery of the vehicle is being charged (step S506). When it is determined that the battery is being charged (YES at step S506), the control unit 100A goes to step S507. On the other hand, when it is determined that the battery is not being charged (NO at step S506), the control unit 100 goes to step S508.

At step S507, the control unit 100A starts the second parking recoding in response to detection of a shock (step S507). Specifically, at step S507, it is determined that an event occurs based on the fact that a shock is detected by the shock detection unit 1251 and imaging data of given periods before and after detection of the shock is saved as event recording data in the recording unit 11. The control unit 100A then goes to step S509.

At step S508, the control unit 100A starts the first parking recording in response to detection of a shock (step S508). Specifically, at step S508, it is determined that an event occurs based on the fact that a shock is detected by the shock detection unit 1251 and, after a given period elapses from the start of recording imaging data after detection of the shock, imaging data of the given period is saved as event recording data in the recording unit 11. The control unit 100A then goes to step S509.

At step S509, the control unit 100A determines whether the parking ends (step S509). When it is determined that the parking does not end (NO at step S509), the control unit 100A goes to step S501 and executes the above-described process. On the other hand, when it is determined that the parking ends (YES at step S509), the control unit 100A ends the process in FIG. 7.

As described above, in the embodiment, it is possible to switch event detection by moving object detection and shock detection according to whether the parking situation has the first attribute, for example, whether the parking position is a regular parking space. In other words, because the user of the vehicle often moves from the vehicle in a parking position in which the duration of parking is relatively long, event detection based on moving object detection that makes it possible to deal with a car break-in, or the like, is performed. In this case, when the battery is being charged, moving object detection is performed while recording is kept performed and, in response to detection of an event, video data of given periods before and after detection of the event is recorded as event recording data based on the data obtained by recording kept performed. When the battery is not being charged, moving object detection is performed without recording kept performed and, in response to detection of an event, recording video data is started and video data of a given period is saved as event recording data. In a parking position in which the duration of parking is relatively short, because the user of the vehicle often stays near the vehicle, event detection based on detection of a shock is performed. In this case, when the battery is being charged, event detection based on acceleration information is performed with recording kept performed and, in response to detection of an event, video data of given periods before and after detection of the event is saved as event recording data based on the data obtained by recording kept performed. When the battery is not being charged, event detection based on acceleration information is performed without recording kept performed and, in response to detection of an event, recording video data is started and video data of a given period is saved as event recording data.

In the process in FIG. 7, when the parking situation has the first attribute, event detection based on acceleration with smaller power consumption than that of moving object detection may be performed and, when the parking situation has the second attribute, evet detection by moving object detection with greater power consumption than that of event detection based on acceleration may be performed. In this case, YES and NO at step S502 in FIG. 7 are switched to each other. In the embodiment, it is possible to switch between the first parking recording of recording data at detection of an event and the second parking recording of keeping recording according to whether the battery is being charged while the vehicle is parked and save event recording data. As a result, in the embodiment, it is possible to appropriately record a video while the vehicle is parked.

FOURTH EMBODIMENT

Figure 8:
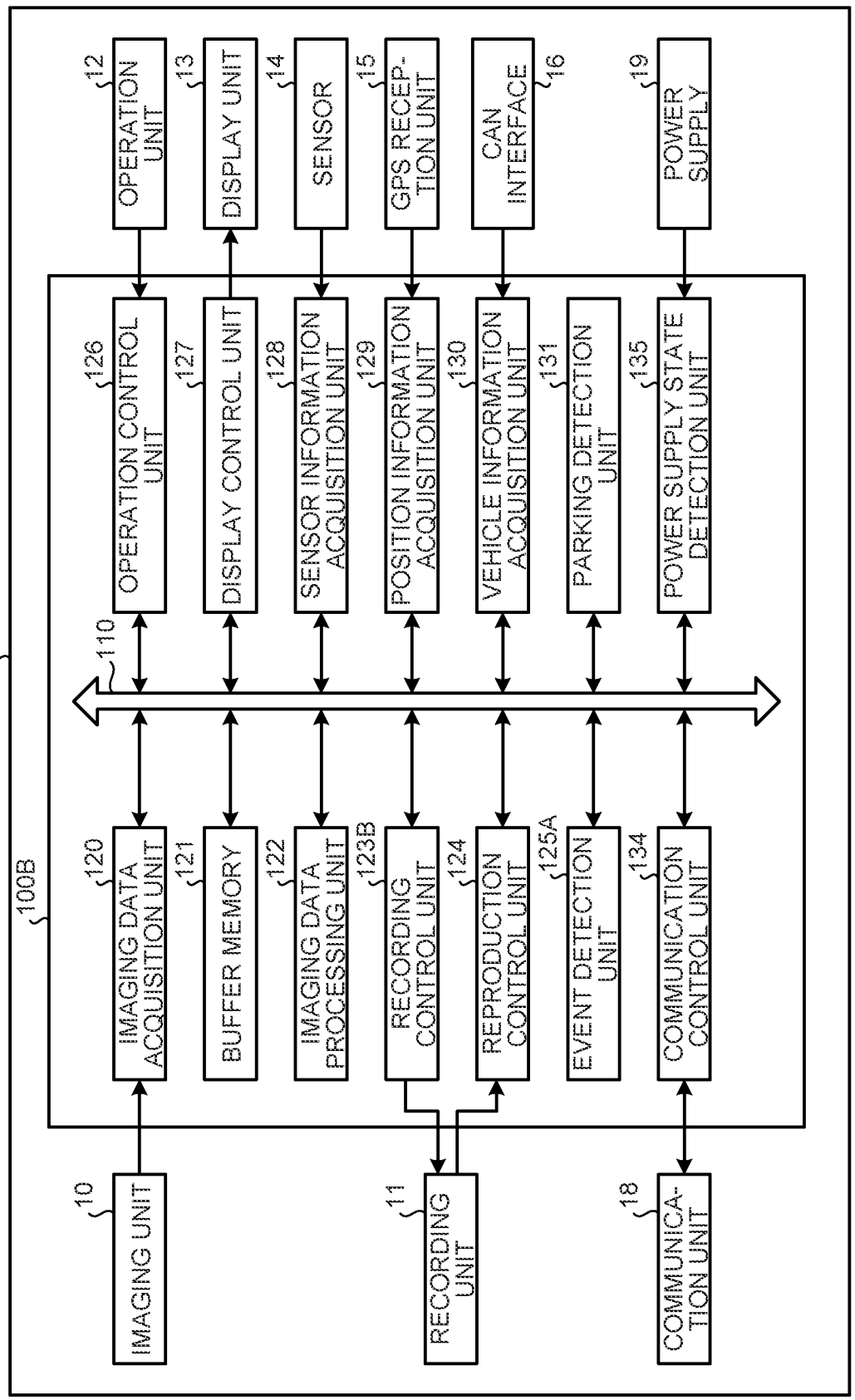
FIG. 8 is a block diagram illustrating an example of a configuration of a recording apparatus according to a fourth embodiment of the disclosure.

Using FIG. 8, a recording apparatus according to a fourth embodiment of the disclosure will be described. FIG. 8 is a block diagram illustrating an example of a configuration of the recording apparatus according to the fourth embodiment of the disclosure.

As illustrated in FIG. 8, a recording apparatus 1B is different from the recording apparatus 1 illustrated in FIG. 1 in including a communication unit 18 and a power supply 19. The recording apparatus 1B is different from the recording apparatus 1 illustrated in FIG. 1 in that a control unit 100B includes a communication control unit 134 and a power supply state detection unit 135 and does not include the charged state detection unit 132.

The communication unit 18 performs information communication with another external device via a wireless network. The communication unit 18, for example, performs information communication with another external device according to control of the communication control unit 134. According to the control of the communication control unit 134, the communication unit 18 transmits imaging data that is captured by the imaging unit 10 to another external device. Another external device is a device that is set previously by a user, or the like. Another external device is not particularly limited and is, for example, a smartphone of a user.

The power supply 19 supplies power to the recording apparatus 1B. The power supply 19 is a battery that is dedicated to the recording apparatus 1B and is connected to the recording apparatus 1B. The power supply 19 may be not included in the configuration of the recording apparatus 1B and may be a battery that supplies power to the recording apparatus 1B from the outside of the recording apparatus 1B. The power supply 19, for example, is a battery that the vehicle in which the recording apparatus 1B is installed includes or an external battery that is connected to the recording apparatus 1B.

In the embodiment, a recording control unit 123B changes the process of recording control according to the state of a power supply available while the vehicle is parked and monitored. The state of the power supply is detected by the power supply state detection unit 135. As the power supply available while the vehicle is parked and monitored, for example, a battery that is mounted on the vehicle or a battery that is dedicated to the recording apparatus 1B and that is incorporated in or connected to the recording apparatus 1B can be exemplified.

Specifically, the recording control unit 123B switches between first parking recording and second parking recoding according to the state of the available power supply. The first parking recording is recording of starting recording imaging data in response to detection of an event. For this reason, in the first parking recording, imaging data of a given period of which recording is started in response to detection of an event is saved as event recording data in the recording unit 11. The second parking recording is recording of keeping recording imaging data in the recording unit 11. Thus, in the second parking recording, imaging data of given periods before and after detection of the event from the imaging data that is kept recorded is saved as event recording data.

For example, when the vehicle starts being parked, the recording control unit 123B switches between the first parking recording and the second parking recording according to the state of the power supply available while the vehicle is parked and performs recording. The recording control unit 123B may switch between the first parking recording and the second parking recording according to whether a value representing the capacity of the power supply exceeds a predetermined threshold (capacity threshold) as the state of the available power supply.

Specifically, in the case where the power supply that is used for parking monitoring is the battery of the vehicle, for example, when the voltage of a 12V battery is under 11.5 V, the recording control unit 123 performs the first parking recording from the start of parking. In this case, when the voltage of the battery is at or above 11.5 V, the recording control unit 123B performs the second parking recording from the start of parking. Even when starting the second parking recording is executed when parking is started, the recording control unit 123B switches the second parking recording to the first parking recording when the battery voltage turns to be under 11.5 V during parking monitoring.

In the case of the power supply dedicated to the recording apparatus 1B that is used for parking monitoring, for example, when the remaining capacity of the battery is under 80%, the recording control unit 123B performs the first parking recording from the start of parking. In this case, when the remaining capacity of the battery is at or above 80%, the recording control unit 123B performs the second parking recording from the start of parking. Even when the second parking recording is executed when parking is started, the recording control unit 123B makes a switches the second parking recording to the first parking recording when the remaining capacity of the battery turns to be under 80% during parking monitoring.

In the embodiment, an event detection unit 125A receives a detection result from the sensor 14. Based on the received detection result, the event detection unit 125A detects an event. The event detection unit 125A, for example, acquires acceleration information on acceleration as the detection result. In this case, the event detection unit 125A detects an event based on the acceleration information. On detecting the event, the event detection unit 125A outputs a control signal indicating information on detection of the event to the recording control unit 123B. Detection of an event by the event detection unit 125A is not limited to detection of an event based on the acceleration information and any event detection may be performed. The event detection unit 125A may detect an event by moving object detection based on video data that is acquired by the imaging data acquisition unit 120, a result of detection by a proximity sensor not illustrated in the drawing, or the like, or a combination of multiple sets of sensor information.

The communication control unit 134 performs information communication between the recording apparatus 1B and another external device by controlling the communication unit 18. For example, according to the control of the recording control unit 123B and using the communication unit 18, the communication control unit 134 transmits the imaging data that is acquired by the imaging data acquisition unit 120 from the imaging unit 10 to another external device. A communication system between the communication control unit 134 and another device is selected freely and, for example, various systems, such as Wi-Fi (trademark) and mobile networks, are usable.

Based on the vehicle information that is received from the vehicle information acquisition unit 130, the power supply state detection unit 135 detects a state of the battery that drives the vehicle. The power supply state detection unit 135, for example, acquires information on the remaining capacity of the battery from the control circuit that controls discharge and charge of current or voltage of the battery that drives the vehicle. The power supply state detection unit 135 detects the state of the power supply 19 that is dedicated to the recording apparatus 1B and that is connected to the recording apparatus 1B. The power supply state detection unit 135 acquires information on the remaining capacity of the power supply 19 from the control circuit that controls charge and discharge of the current or voltage of the power supply 19.

Process of Fourth Embodiment

Figure 9:
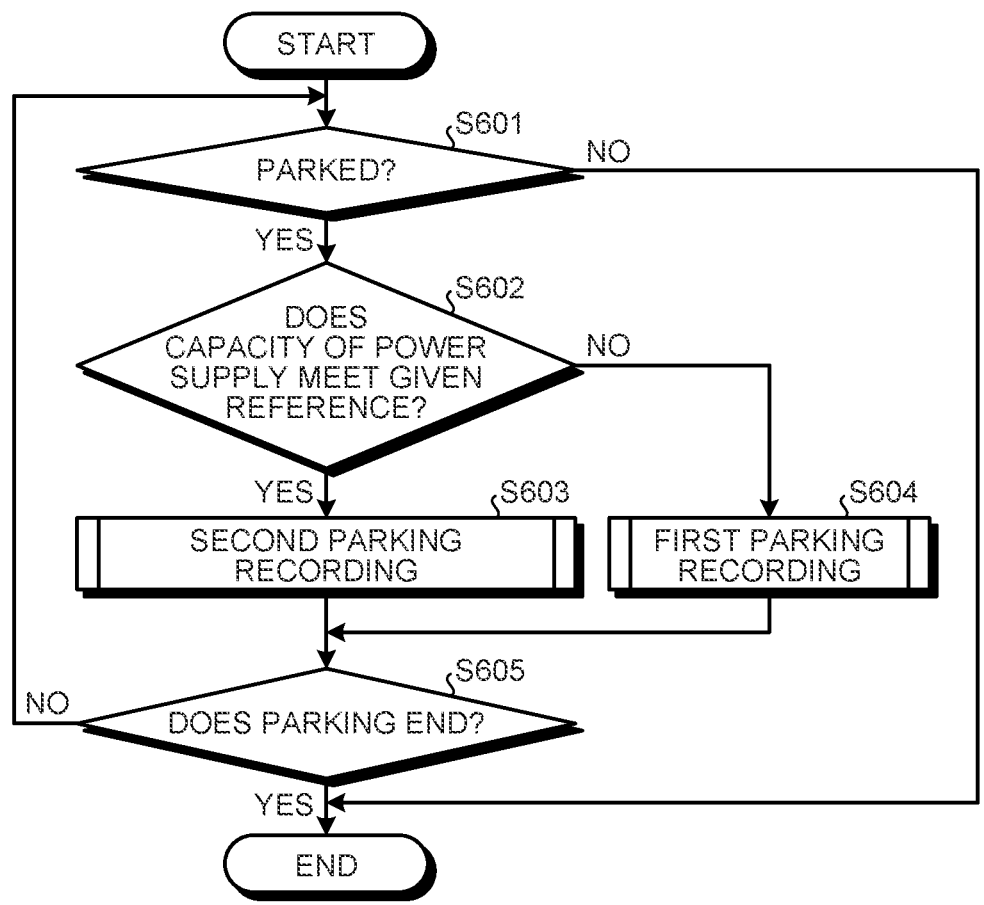
FIG. 9 is a flowchart illustrating an example of a flow of a process performed by a recording control device according to the fourth embodiment of the disclosure.

Using FIG. 9, a process performed by the control unit 100B of the recording apparatus 1B according to the fourth embodiment will be described. FIG. 9 is a flowchart illustrating an example of a flow of the process performed by the control unit 100B.

The process of step S601 is the same as the process of step S101 illustrated in FIG. 2 and description thereof is omitted.

The control unit 100B determines whether the remaining capacity of the power supply that is used while the vehicle is parked meets a given reference (step S602). When it is determined that the remaining capacity of the power supply meets the given reference (YES at step S602), the control unit 100B goes to step S603. On the other hand, when it is determined that the remaining capacity of the power supply does not meet the given reference (NO at step S602), the control unit 100B goes to step S604. At step S602, in determination on whether the remaining capacity of the power supply meets the given reference, it is determined whether it is such remaining capacity as that inhibiting the second parking recording performed while the vehicle is parked from hindering traveling after parking, that is, whether the remaining capacity of the power supply is at or above a predetermined threshold.

The processes of steps S603 to S605 are the same as those of steps S103 to S105 illustrated in FIG. 2, respectively, and thus description thereof is omitted.

Figure 10:
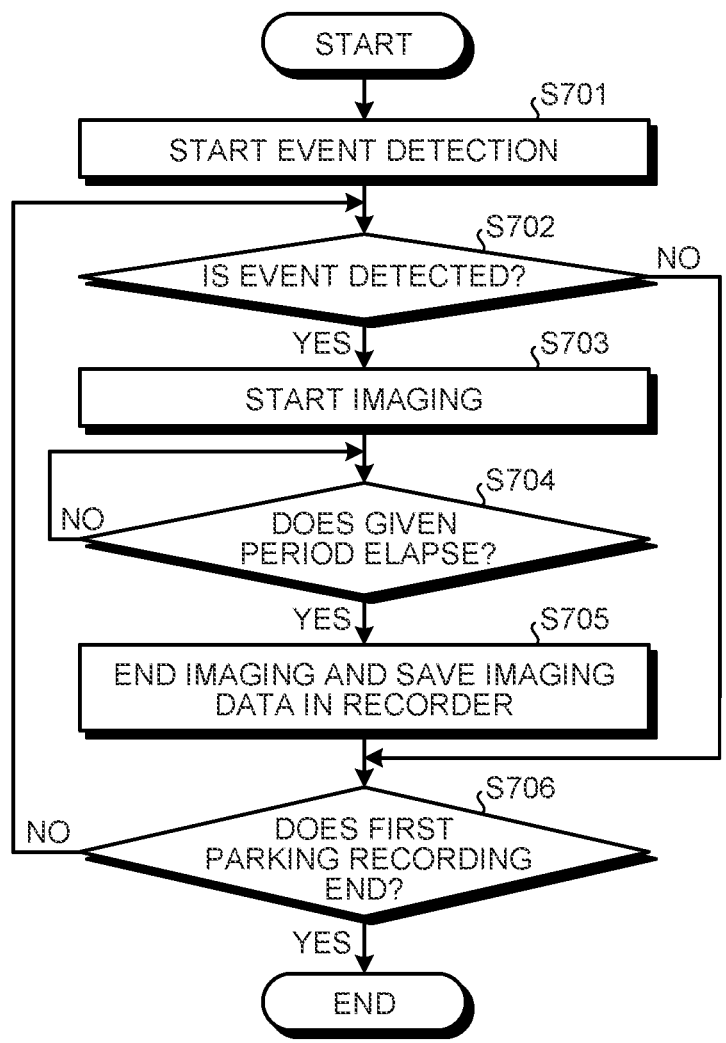
FIG. 10 is a flowchart illustrating an example of a flow of a process of first parking recording.

Using FIG. 10, the process of the first parking recording according to the fourth embodiment of the disclosure will be described. FIG. 10 is a flowchart illustrating an example of a flow of the process of the first parking recording according to the fourth embodiment of the disclosure.

The processes of step S701, step S702, step S704, and step S706 are the same as those of processes of step S201, step S202, step S204 and step S206 illustrated in FIG. 3, respectively, and thus description thereof is mitted.

At step S703, the control unit 100B starts an operation of the imaging unit 10 (step S703). The control unit 100B then goes to step S704.

When an YES determination is made at step S704, the control unit 100B ends imaging by the imaging unit 10 after a given period elapses from start of recoding imaging data and saves the imaging data of the given period as event recording data in the recording unit 11 (step S705). The control unit 100B then goes to step S706.

Figure 11:
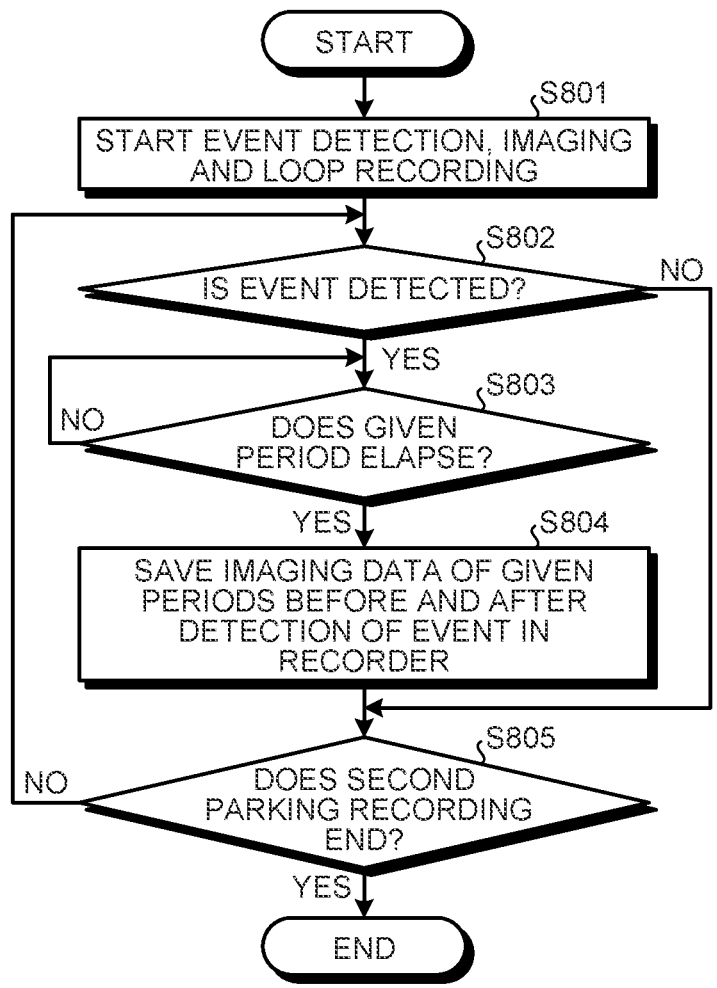
FIG. 11 is a flowchart illustrating the example of a flow of a process of second parking recording.

Using FIG. 11, a process of the second parking recording according to the fourth embodiment of the disclosure will be described. FIG. 11 is a flowchart illustrating an example of a flow of the process of the second parking recording according to the fourth embodiment of the disclosure.

The processes of step S802, step S803 and step S805 are the same as the processes of step S301, step S303, and step S305 illustrated in FIG. 4, respectively, and thus description thereof is omitted.

First of all, the control unit 100B starts an event detection process performed by the event detection unit 125, imaging performed by the imaging unit 10, and a process of loop recording of imaging data that is captured by the imaging unit 10 (step S801). The control unit 100B then goes to step S802.

When an YES determination is made at step S803, the control unit 100B saves imaging data of given periods before and after detection of an event in the recording unit 11 (step S804). The control unit 100B then goes to step S805.

As descried above, in the embodiment, it is possible switch between the first parking recording of recording data at detection of an event and the second parking recording of keeping recording according to the state of a power supply that is used while the vehicle is parked and save event recording data. As a result, in the embodiment, it is possible to appropriately record a video while the vehicle is parked. Specifically, because the second parking recording is executed when the capacity of the power supply exceeds the given reference and the first parking recording is executed when the capacity of the power supply does not meet the given reference, it is possible to record event recording data appropriately even when the capacity of the power supply is small.

FIFTH EMBODIMENT

Figure 12:
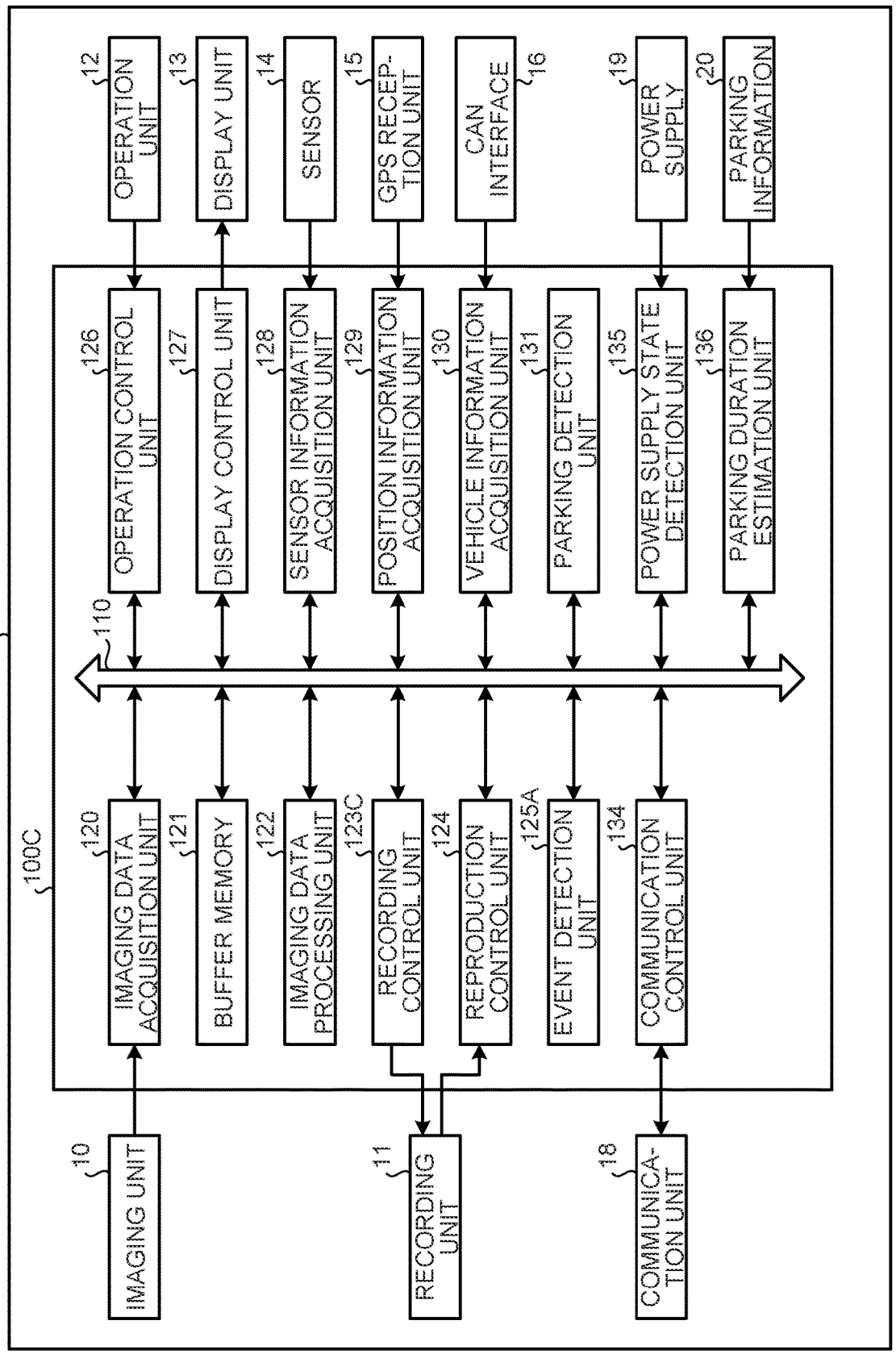
FIG. 12 is a block diagram illustrating an example of a configuration of a recording apparatus according to a fifth embodiment of the disclosure.

Using FIG. 12, a recording apparatus according to a fifth embodiment of the disclosure will be described. FIG. 12 is a block diagram illustrating an example of a configuration of the recording apparatus.

As illustrated in FIG. 12, a recording apparatus 1C is different from the recording apparatus 1B illustrated in FIG. 8 in that a control unit 100C includes a parking duration estimation unit 136.

In the embodiment, the parking detection unit 131 outputs a detection result indicating whether the vehicle is parked to the parking duration estimation unit 136. In this case, the parking duration estimation unit 136 acquires current position information that is parking position information from the position information acquisition unit 129.

The parking duration estimation unit 136 refers to parking information 20 based on the parking position information that is acquired from the position information acquisition unit 129 and acquires estimated duration of parking.

In the embodiment, the parking information 20 is information that is stored in a storage that is not illustrated in the drawing in the recording apparatus 1C, a navigation device that is available, another server device, or the like. Specifically, the parking information 20, for example, contains tendency information on the vehicle in which the recording apparatus 1C is installed and tendency information corresponding to facility information.

The tendency information on the vehicle in which the recording apparatus 1C is installed contains information on the current parking position in which the vehicle tends to be parked for a relatively long duration regularly, such as home (for example, the average duration of parking is 8 hours or more) or the place of employment (for example, the average parking duration is 9 hours or more). The tendency information on the vehicle in which the recording apparatus 1C is installed contains information on the current parking position in which the vehicle tends to be parked for a relatively short duration, such as an often visited supermarket (for example, the average duration of parking is 20 minutes) or a convenience store (for example, the average duration of parking is 5 minutes).

The tendency information corresponding to the facility information contains information on a general average duration of parking in a parking space of a facility of the parking position. It is, for example, a public facility A (for example, an average duration of parking is 50 minutes), a shopping mall B (for example, an average duration of parking is 3 hours), or a convenience store C (for example, an average duration of parking is 6 minutes).

In the embodiment, a recording control unit 123C switches between first parking recording and second parking recoding based on the estimated duration of parking that is acquired by the parking duration estimation unit 136. The recording control unit 123C switches between the first parking recording and the second parking recoding according whether the estimated duration of parking exceeds a predetermined threshold (duration threshold). The recording control unit 123C switches between the first parking recording and the second parking recording based on the estimated duration of parking that is acquired by the parking duration estimation unit 136 in addition to the state of the power supply available when the vehicle is parked and monitored.

Process of Fifth Embodiment

Figure 13:
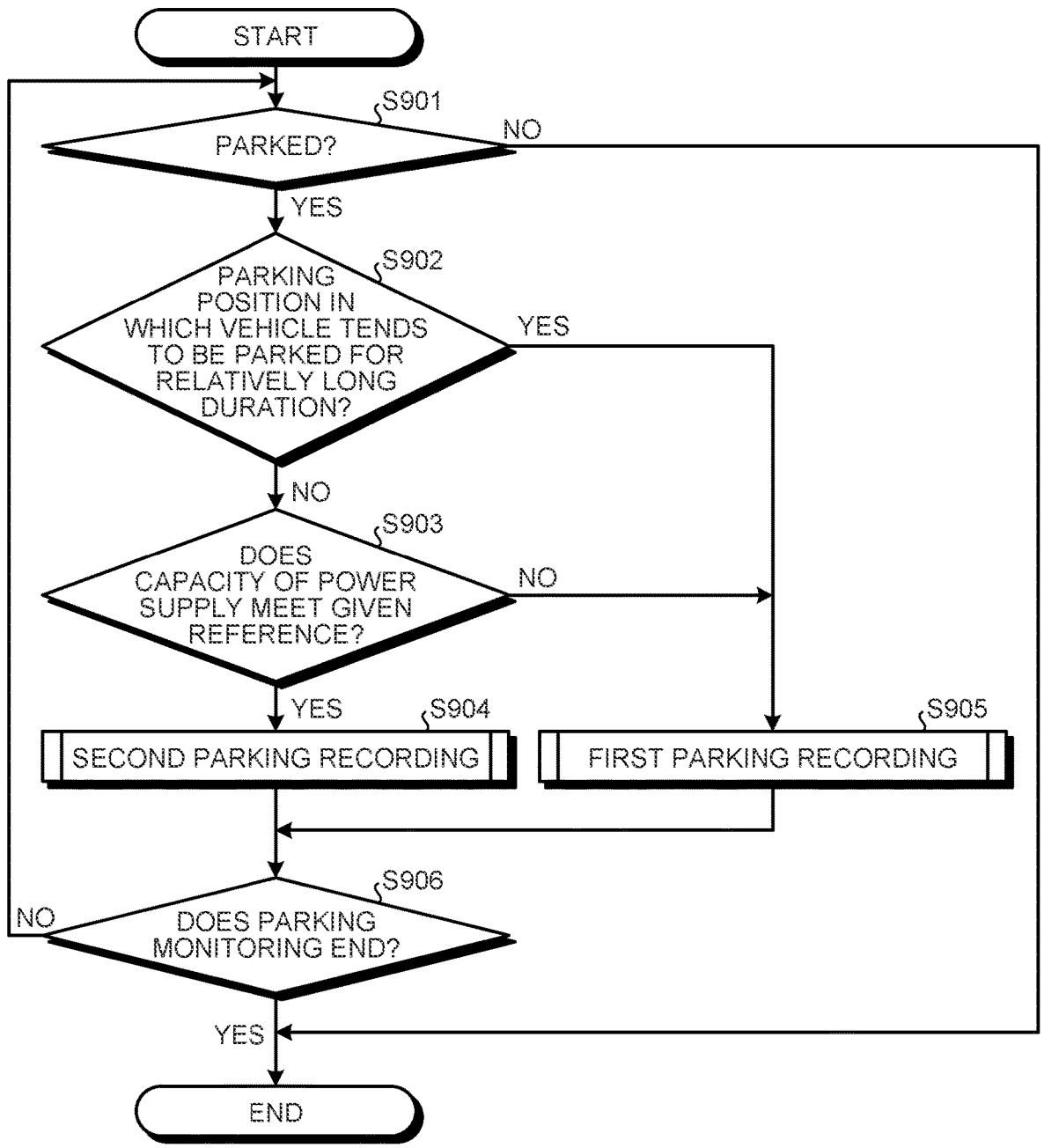
FIG. 13 is a flowchart illustrating an example of a flow of a process performed by a recording control device according to the firth embodiment of the disclosure.

Using FIG. 13, a process performed by the control unit 100C of the recording apparatus 1C according to the fifth embodiment will be described. FIG. 13 is a flowchart illustrating an example of a flow of the process performed by the control unit 100C.

The processes of step S901 and steps S904 to S905 are the same as the processes of step S601 and steps S603 to S604 illustrated in FIG. 9, respectively, and thus description thereof is omitted.

When an YES determination is made at step S901, the control unit 100C determines whether the current position is a parking position in which the vehicle tends to be parked for a relatively long duration (step S902). When it is determined that it is a parking position in which the vehicle tends to be parked for a relatively long duration (YES at step S902), the control unit 100C goes to step S905. On the other hand, when it is determined that it is not a parking position in which the vehicle tends to be parked for a relatively long duration (NO at step S902), the control unit 100C goes to step S903.

When a NO determination is made at step S902, the control unit 100C determines whether the power supply capacity meets a predetermined reference (step S903). When it is determined that the power supply capacity meets the predetermined reference (YES at step S903), the control unit 100C goes to step S904. On the other hand, when it is determined that the power supply capacity does not meet the predetermined reference (NO at step S903), the control unit 100C goes to step S905.

As described above, in the embodiment, it is possible to switch between the first parking recording and the second parking recording based on the duration of parking that is estimated. Specifically, in the embodiment, it is possible to execute the first parking recording when it is estimated that the vehicle will be parked for a relatively long time. Thus, in the embodiment, it is possible to record event recording data appropriately even when the vehicle is parked for a relatively long time.

In the embodiment, when it is estimated that the vehicle will be parked for a relatively short time, it is possible to switch between the first parking recording and the second parking recording based on the power supply capacity. Thus, when it is estimated that the vehicle will be parked for a relatively short time and the power supply capacity is at or above the given reference, it is possible to save event recording data appropriately by performing the second parking recording. When it is estimated that the vehicle will be parked for a relatively short time and the power supply capacity does not meet the given reference, it is possible to save event recording data appropriately by performing the first parking recording.

SIXTH EMBODIMENT

Figure 14:
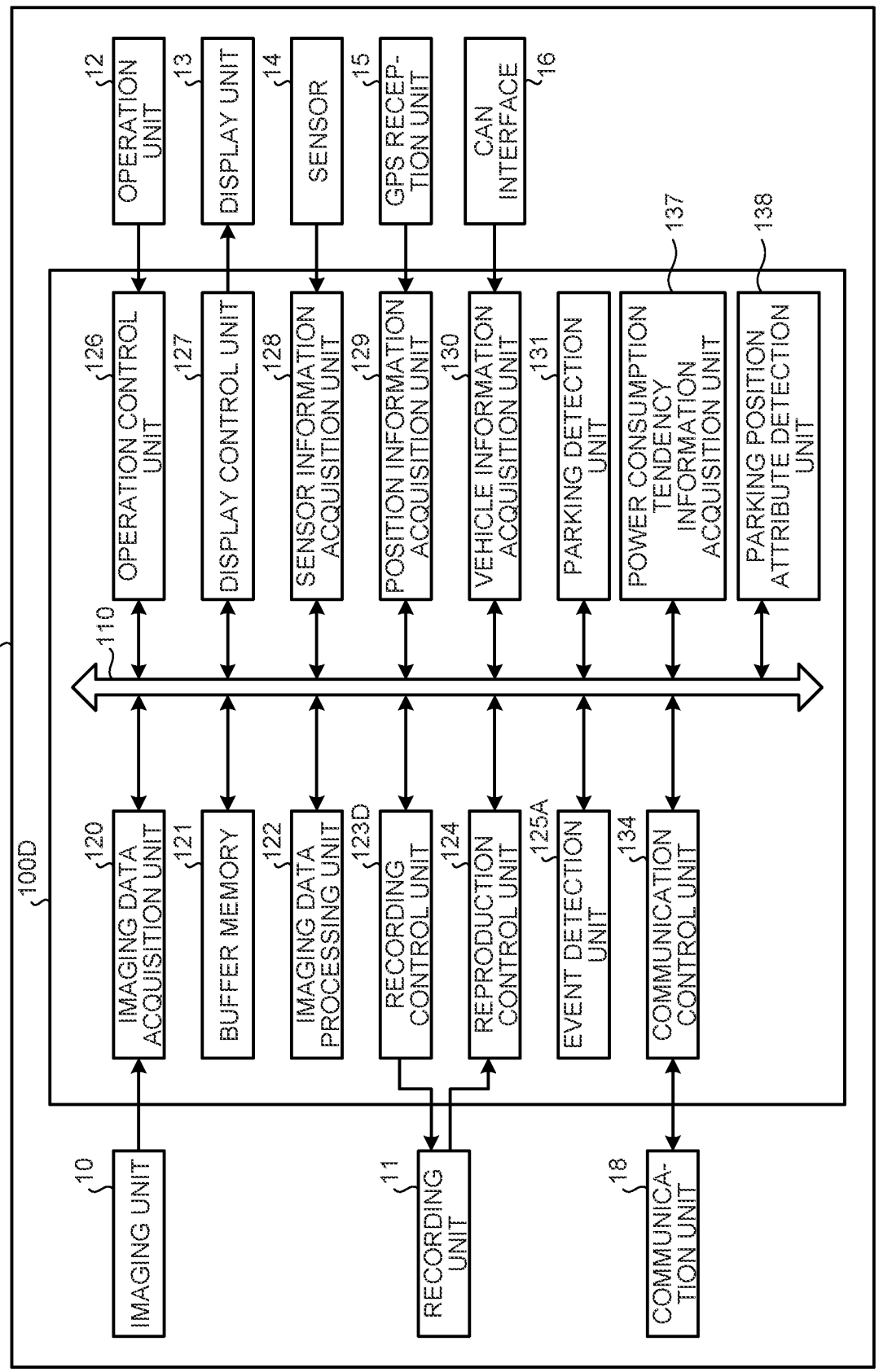
FIG. 14 is a block diagram illustrating an example of a configuration of a recording apparatus according to a sixth embodiment of the disclosure.

Using FIG. 14, a recording apparatus according to a sixth embodiment of the disclosure will be described. FIG. 14 is a block diagram illustrating an example of a configuration of the recording apparatus according to the sixth embodiment.

A recording apparatus 1D is different from the recording apparatus 1B illustrated in FIG. 8 in not including the power supply 19. The recording apparatus 1D is different from the recording apparatus 1B illustrated in FIG. 8 in that a control unit 100D includes a power consumption tendency information acquisition unit 137 and a parking position attribute detection unit 138 and does not include the power supply state detection unit 135.

In the embodiment, a recording control unit 123D changes a recording control process according to a power consumption tendency. A power consumption tendency is detected by the power consumption tendency information acquisition unit 137. Specifically, the recording control unit 123D switches between first parking recording and second parking recording according to the power consumption tendency. The first parking recording is recording of starting recording imaging data in response to detection of an event. Thus, in the first parking recording, is saved in the recording unit 11 as event recording data of a given period of which recording is started in response to detection of an event. The second parking recording is recording of keeping recording imaging data in the recording unit 11. Thus, in the second parking recording, imaging data of given periods before and after detection of the event from the imaging data that is kept recorded is saved as event recording data.

The recording control unit 123D may change the process of recording control based on the attribute of a parking position based on the current parking position information. The attribute of the parking position is detected by the parking position attribute detection unit 138. In this case, when the position in which the vehicle is parked is a parking position in which the vehicle is parked temporarily, the recording control unit 123 switches between the first parking recording and the second parking recording and executes the recording.

The power consumption tendency information acquisition unit 137 acquires information representing the power consumption tendency of the battery of the vehicle. The power consumption tendency information acquisition unit 137 acquires information representing the power consumption tendency of the battery of the vehicle based on a travel history of the vehicle. Based on the travel history of the vehicle, the power consumption tendency information acquisition unit 137 acquires information representing an amount of power of the battery of the vehicle is consumed per a unit distance.

The power consumption tendency based on the travel history contains information indicating that an average power consumption per unit distance based on the travel history before parking increases, for example, by 10% to 20% or more with respect to the average power consumption per unit distance in the travel history of the same vehicle in another period. For example, the case where the average power consumption of the vehicle per unit distance is, for example, 0.1 kWh/km and the average power consumption per unit distance based on the travel history before parking is, for example, 0.2 kWh/km applies to this. The cause of change in average power consumption includes the case where the power consumption increases because of unevenness or curves of a travel path and the travel speed before parking. As the cause of change in average power consumption, the case where the power consumption increases due to a difference in timing of acceleration and deceleration because of the psychological condition of the driver, driving by a different driver, or the like, can be assumed.

The parking position attribute detection unit 138 detects the attribute of the parking position based on the parking position information obtained when the parking detection unit 131 detects that the vehicle is parked. Specifically, the parking position attribute detection unit 138 detects whether the current parking position is a temporary parking position. The temporary parking position means a parking position, such as a commercial facility or a tourist facility. Particularly, the parking position attribute detection unit 138 detects a parking position where a regular duration of parking is, for example, under 60 minutes as the temporary parking position. The parking position in which the duration of parking is under 60 minutes is regarded as the temporal parking positon; however, this is an example and does not limit the disclosure.

Process of Sixth Embodiment

Figure 15:
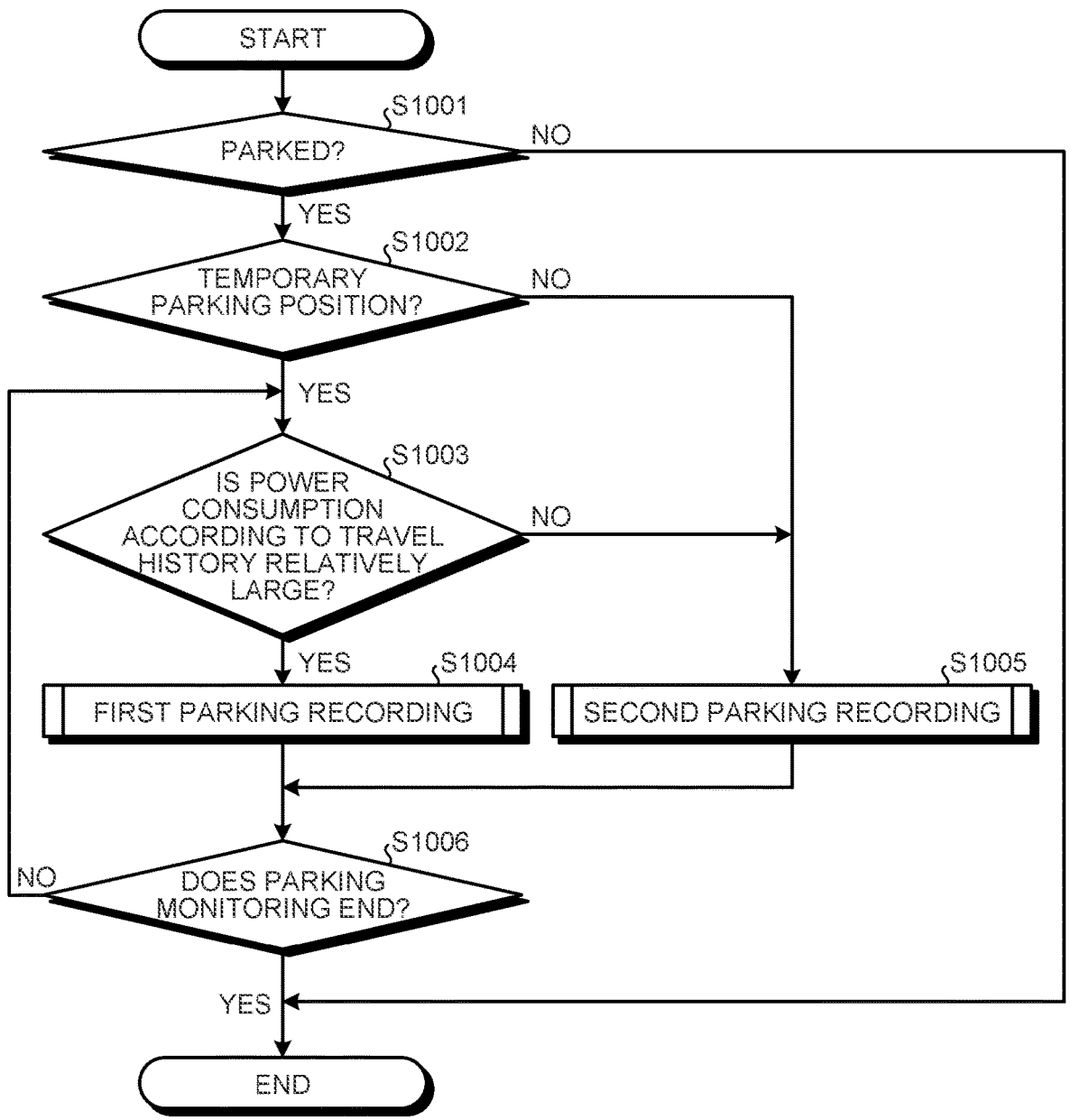
FIG. 15 is a flowchart illustrating an example of a flow of a process performed by a recording control device according to the sixth embodiment of the disclosure.

Using FIG. 15, a process performed by the control unit 100D of the recording apparatus 1D according to the sixth embodiment will be described. FIG. 15 is a flowchart illustrating an example of a flow of the process performed by the control unit 100D.

The processes of step S1001 and steps S1004 to S1006 are the same as the processes of step S101 and steps S103 to S105 illustrated in FIG. 2, respectively, and thus description thereof is omitted.

When an YES determination is made at step S1001, the control unit 100D determines whether the position in which the vehicle is parked is a temporary parking position (step S1002). When it is determined that it is a temporary parking position (YES at step S1002), the control unit 100D goes to step S1003. On the other hand, when it is determined that it is not a temporary parking position (NO at step S1002), the control unit 100D goes to step S1005.

When an YES determination is made at step S1002, the control unit 100D determines whether the power consumption according to the travel history is relatively large (step S1003). When it is determined that the power consumption is relatively large (YES at step S1003), the control unit 100D goes to step S1004. On the other hand, when it is determined that the power consumption is relatively small (NO at step S1003), the control unit 100D goes to step S1005.

SEVENTH EMBODIMENT

Figure 16:
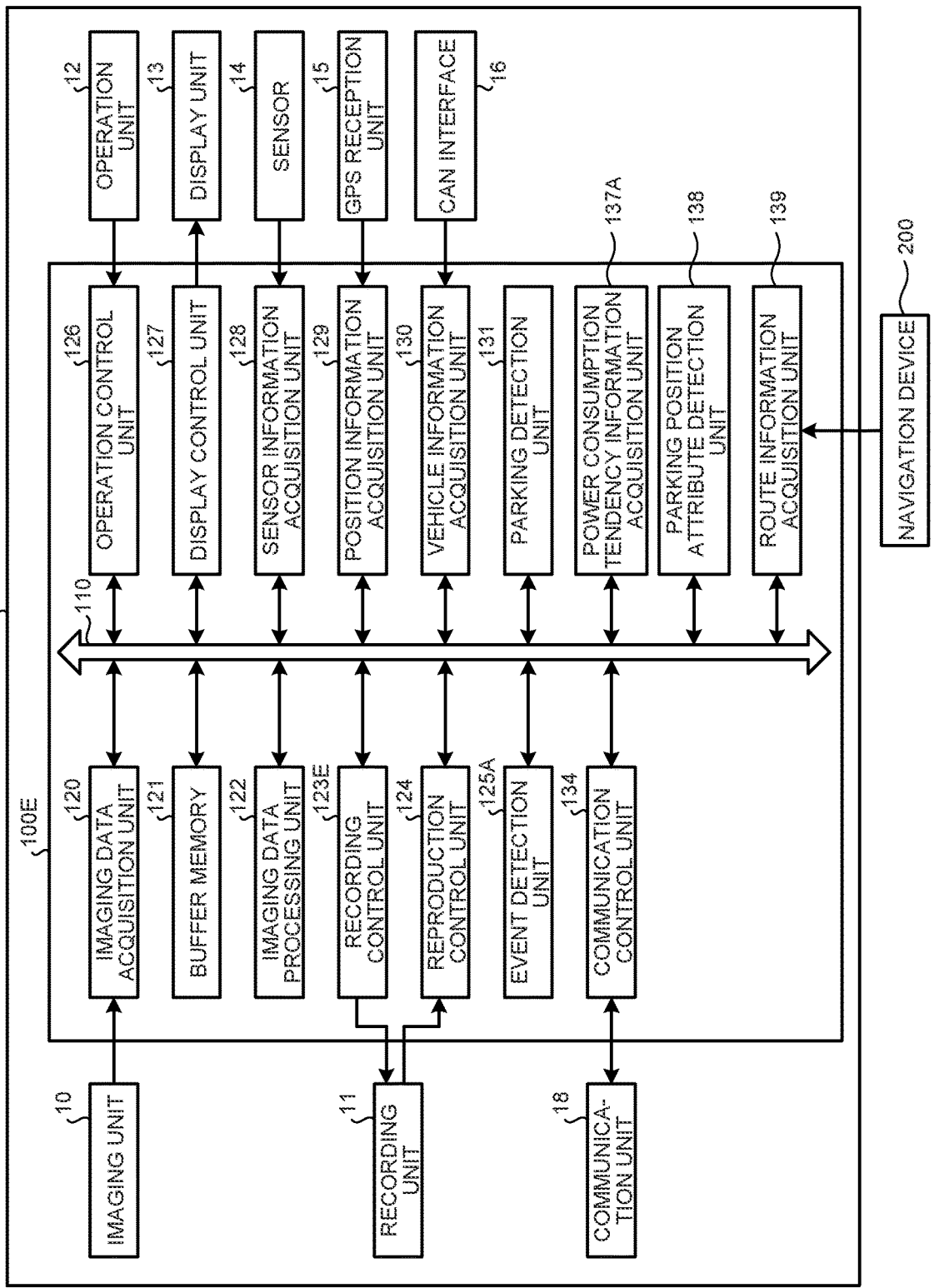
FIG. 16 is a block diagram illustrating an example of a configuration of a recording apparatus according to a seventh embodiment of the disclosure.

Using FIG. 16, a recording apparatus according to a seventh embodiment of the disclosure will be described. FIG. 16 is a block diagram illustrating an example of a configuration of the recording apparatus according to the seventh embodiment of the disclosure.

As illustrated in FIG. 16, a recording apparatus 1E is different from the recording apparatus 1D illustrated in FIG. 14 in that a control unit 100E includes a route information acquisition unit 139.

The route information acquisition unit 139 acquires expected travel route information on an expected route that a vehicle is to travel. The route information acquisition unit 139, for example, acquires expected travel route information from a navigation device 200 that provides travel route guidance and that is installed in the vehicle.

In the seventh embodiment, a power consumption tendency information acquisition unit 137A acquires information representing a power consumption tendency based on expected travel route information that is acquired by the route information acquisition unit 139.

The power consumption tendency based on the expected travel route information contains the fact that an average power consumption per unit distance based on a travel history before parking or an average power consumption per unit in the travel history in another period is 0.1 kWh/km and a power consumption estimated according to the expected travel route is 0.2 kWh/km. The cause of change in estimated power consumption is the case where the power consumption increases because of unevenness and curves of the expected travel route, a travel speed estimated in the expected travel route, etc.

In the embodiment, a recording control unit 123E switches between the first parking recording and the second parking recording based on the power consumption tendency that is estimated according to the expected travel route information.

Process of Seventh Embodiment

Figure 17:
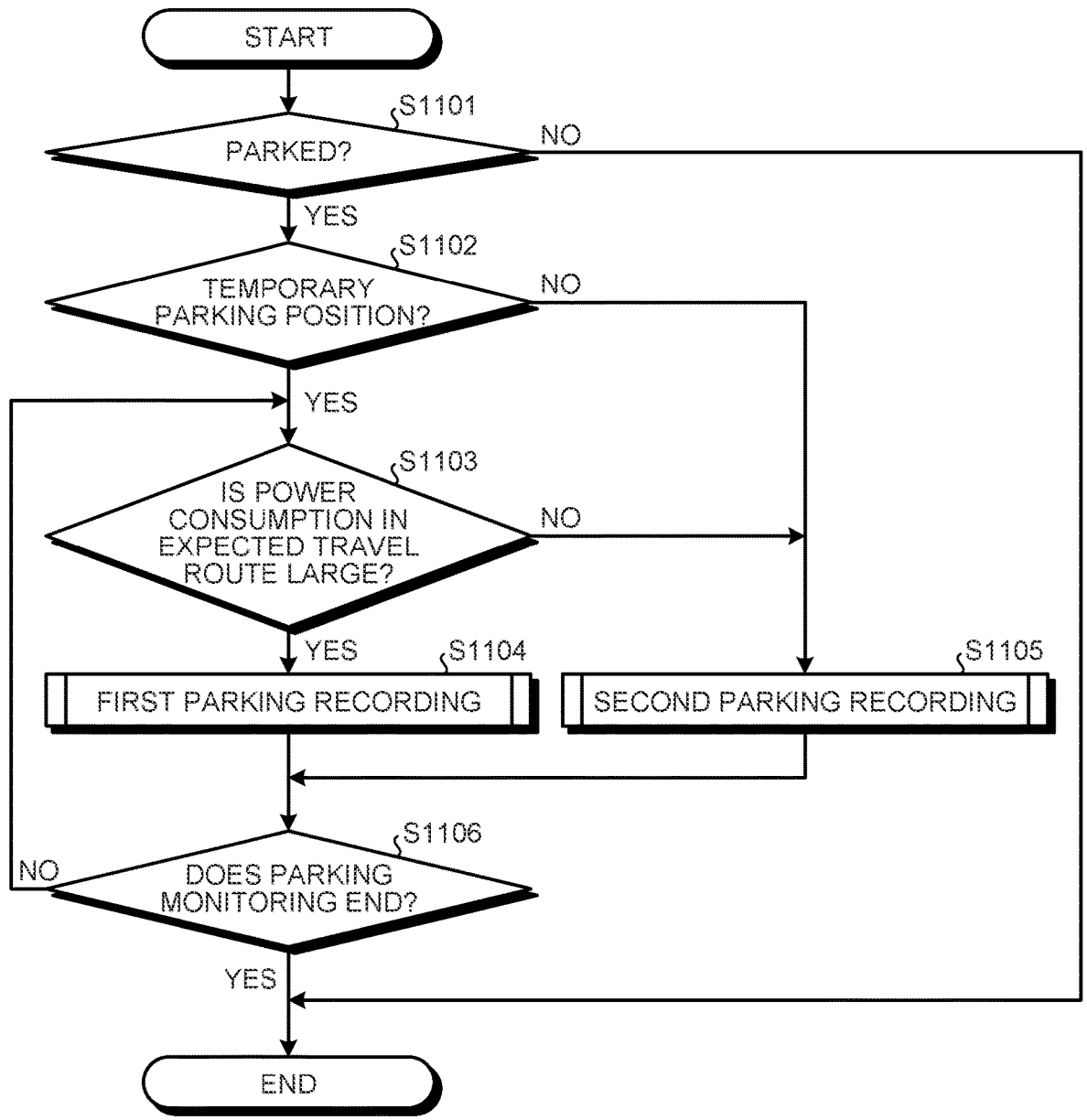
FIG. 17 is a flowchart illustrating an example of a flow of a process performed by a recording control device according to the seventh embodiment of the disclosure.

Using FIG. 17, a process performed by the control unit 100E of the recording apparatus 1E according to the seventh embodiment will be described. FIG. 17 is a flowchart illustrating an example of a flow of the process performed by the control unit 100E.

The processes of step S1101, step S1102, and steps S1104 to S1106 are the same as the processes of step S1001, step S1002, and steps S1004 to S1006 illustrated in FIG. 15, respectively, and thus description thereof is omitted.

When an YES determination is made at step S1102, the control unit 100E determines whether the power consumption in an expected travel route is relatively large (step S1103). When it is determined that the power consumption is relatively large (YES at step S1103), the control unit 100E goes to step S1104. On the other hand, when it is determined that the power consumption is relatively small (NO at step S1103), the control unit 100D goes to step S1105.

As described above, in the embodiment, it is possible to switch between first parking recording and second parking recording based on the power consumption in the expected travel route. Specifically, in the embodiment, the first parking recording is executed when it is estimated that the power consumption in the expected travel route is relatively large and the second parking recording is executed when it is estimated that the power consumption is relatively small. Thus, in the embodiment, because the first parking recording with a small power consumption is executed when it is estimated that the power consumption in the expected travel route is relatively large, it is possible to prevent a shortage of the power of the battery.

Eighth Embodiment

Figure 18:
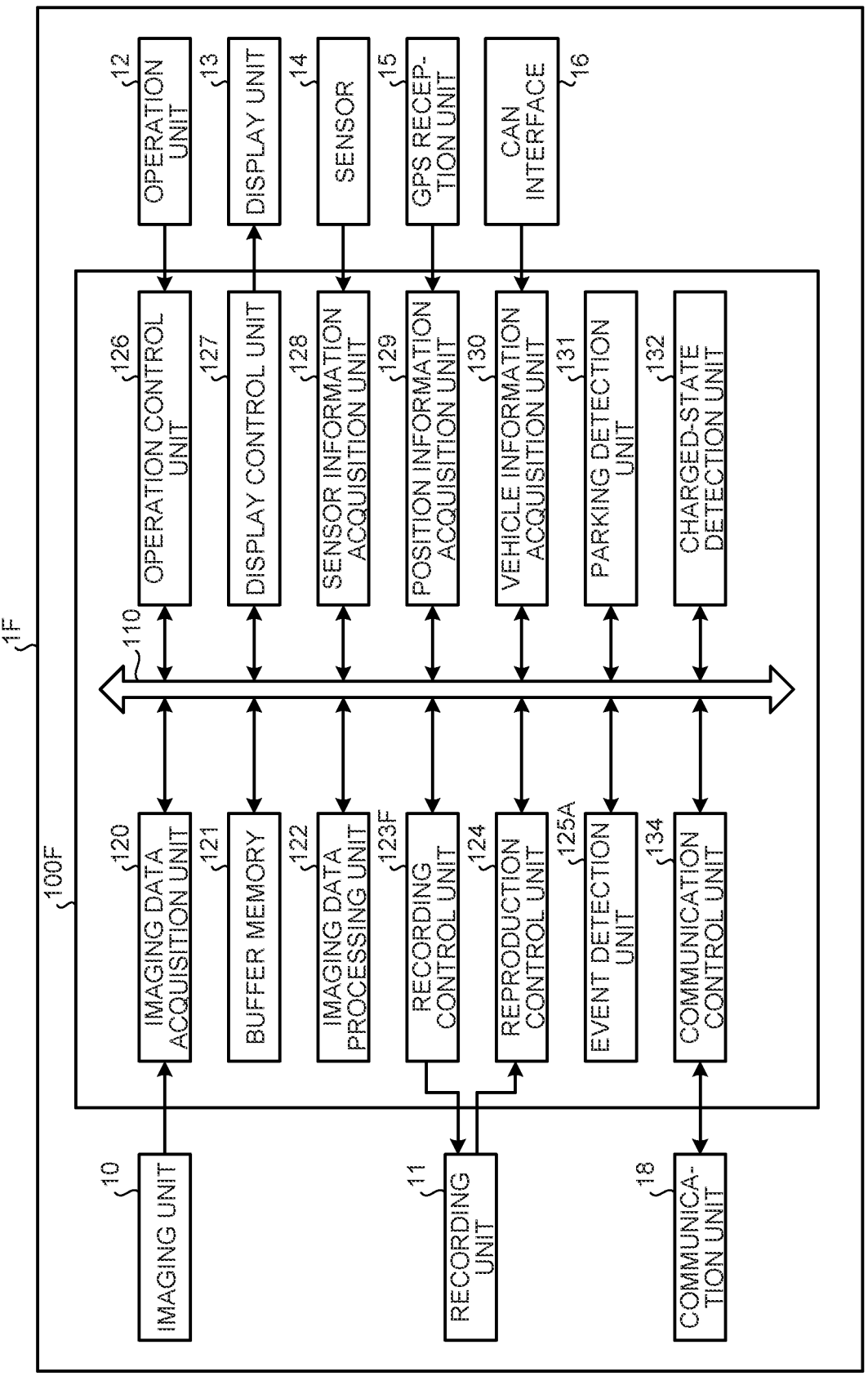
FIG. 18 is a block diagram illustrating an example of a configuration of a recording apparatus according to an eighth embodiment of the disclosure.

Using FIG. 18, a recording apparatus according to an eighth embodiment of the disclosure will be described. FIG. 18 is a block diagram illustrating an example of a configuration of the recording apparatus according to the eighth embodiment of the disclosure.

A recording apparatus 1F is different from the recording apparatus 1B illustrated in FIG. 8 in that a control unit 100F includes the charged-state detection unit 132 and does not include the power supply state detection unit 135.

A recording control unit 123F changes the process of recording control according to whether the battery of the vehicle is being charged. Specifically, when the vehicle is parked and the battery of the vehicle is not being charged, the recording control unit 123F performs first parking recording of saving imaging data resulting from an event that is detected as event recording data in the recording unit 11. When the vehicle is parked and the battery of the vehicle is not being charged, the recording control unit 123F may save imaging data resulting from an event that is detected as event recording data in the recording unit 11 and transmit event detection information indicating that the event is detected to an externa device. The event detection information may contain information that is detected as an event by a senor. Specifically, the event detection information may contain information on a magnitude of acceleration that is detected as an event. When the vehicle is parked and the battery of the vehicle is being charged, the recording control unit 123F controls the communication control unit 134 and performs second parking recording of transmitting imaging data to an external device and causing the external device to save the imaging data as event recording data.

The recording control unit 123F changes a recording process when the imaging data acquisition unit 120 changes the process of acquiring imaging data according to whether the battery of the vehicle is being charged. In this case, when the vehicle is parked and is being charged, the recording control unit 123F controls the communication control unit 134 and transmits imaging data of given periods before and after detection of an event as event recording data that is imaging data resulting from the event to an external device. When the vehicle is parked and is not being charged, the recording control unit 123F records imaging data of a given period from operating of the imaging unit 10 after detection of an event in the recording unit 11 as event recording data that is imaging data resulting from the event.

When information on the remaining capacity of the battery of the vehicle is received, the recording control unit 123F may change the process of recording control according to the remaining capacity of the battery. Specifically, the recording control unit 123F performs the first parking recording when the vehicle is parked and is being charged and the remaining capacity of the battery of the vehicle is under a given capacity. The recording control unit 123F performs the second parking recording when the vehicle is parked and is being charged and the remaining capacity of the battery of the vehicle is at or above the given capacity. The given capacity is, for example, 25% to 50% of the full charge of the battery but is not limited thereto. The given capacity may be set freely by the user. The given capacity may be set based on the travel record of the user. For example, the second parking recording may be performed when it is determined that charging is unnecessary based on the travel record of the user.

When the battery is being charged, the recording control unit 123F may change the process of recording control according to the rate of charging the battery when the battery is being charged. The recording control unit 123F, for example, may perform the first parking recording when charging is performed at a normal rate. The recording control unit 123F, for example, may perform the second parking recording when the battery is being charged rapidly at an electric charge station enabling rapid charging, or the like.

Process of Eighth Embodiment

A process performed by the control unit 100F of the recording apparatus 1F according to the eighth embodiment and a process of first parking recording according to the eighth embodiment are the same as those illustrated in FIGS. 2 and 3, respectively, and thus description thereof is omitted.

Figure 19:
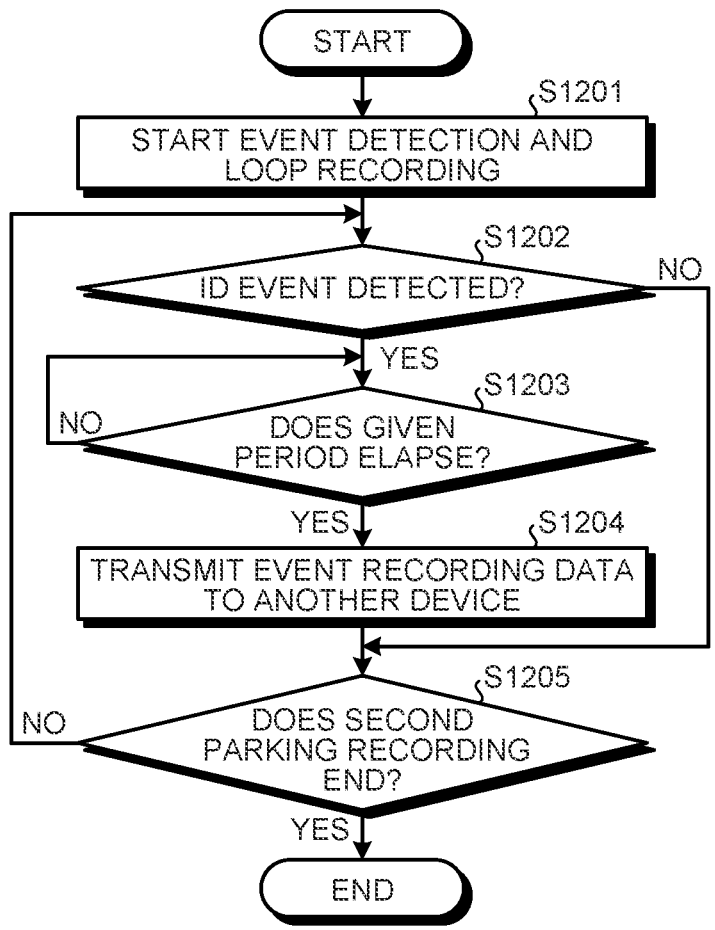
FIG. 19 is a flowchart illustrating an example of a flow of a process of second parking recording according to the eighth embodiment of the disclosure.

Using FIG. 19, a process of second parking recording according to the eighth embodiment of the disclosure will be described. FIG. 19 is a flowchart illustrating an example of a flow of the process of the second parking recording according to the eighth embodiment of the disclosure.

The processes of steps S1201 to S1203 and step S1205 are the same as the processes of steps S301 to S303 and step S305 illustrated in FIG. 4, respectively, and thus description thereof is omitted.

When an YES determination is made at step S1203, the control unit 100F transmits imaging data of given periods before and after detection of an event as event recording data in another external device (step S1204). The control unit 100 then goes to step S1205.

As described above, in the embodiment, it is possible to switch between the first parking recording and the second parking recording and save the record of data at detection of an event according to whether the battery is being charged while the vehicle is parked. This is because transmitting the event recording data resulting from the event to another device consumes more power than when the event recording data is recorded in the recording unit. As a result, in the embodiment, it is possible to record a video appropriately while the vehicle is parked.

Specifically, because it is possible to transmit imaging data to another external device during charging, it is possible to record an event more assuredly. When charging is not performed, recording after detection of the event makes it possible to record an event while reducing power consumption of the battery. While the vehicle is parked, the user of the vehicle is often away from the vehicle because the duration of parking with the battery being charged tends to be relatively longer than that of parking with the battery not being charged. For this reason, the second parking recording is performed when the battery of the vehicle is being charged while the vehicle is parked and event recording data is saved in a smartphone of the user, or the like, which allows the user to appropriately deal with the event.

Process of Ninth Embodiment

Figure 20:
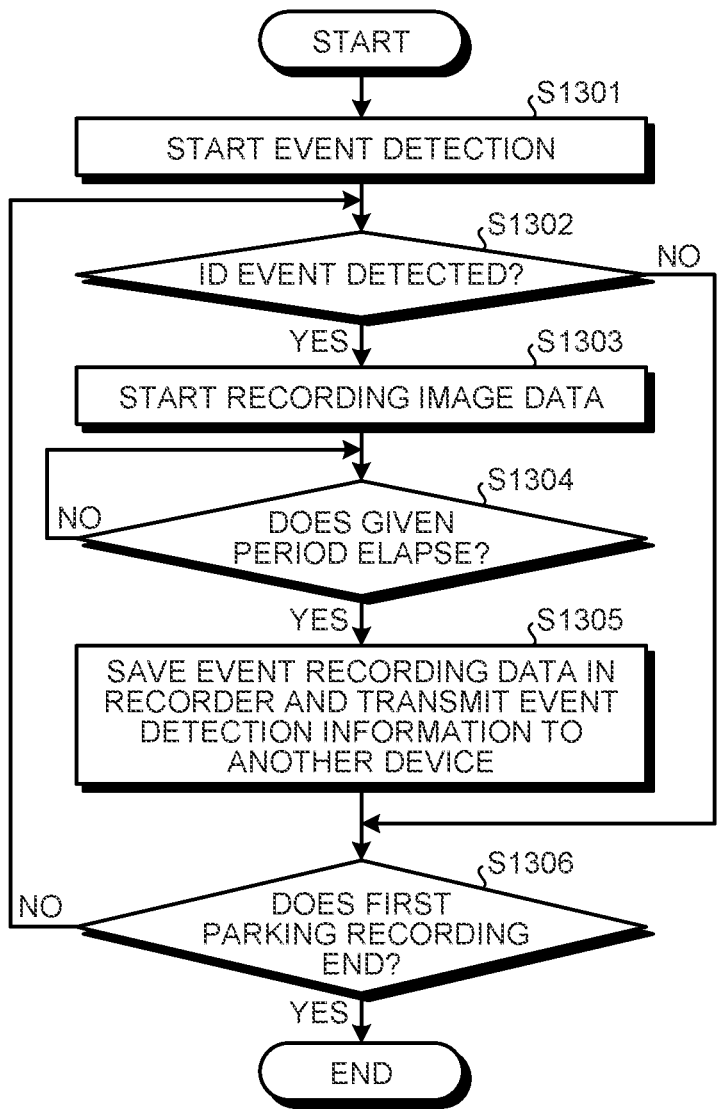
FIG. 20 is a flowchart illustrating an example of a flow of a process of first parking recording according to a ninth embodiment of the disclosure.

Using FIG. 20, a process of first parking recording according to the ninth embodiment of the disclosure will be described. FIG. 20 is a flowchart illustrating an example of a flow of the process of first parking recording according to the ninth embodiment of the disclosure.

The processes of steps S1301 to S1304 and step S1306 are the same as the processes of steps S201 to S204 and step S206 illustrated in FIG. 3, respectively, and thus description thereof is omitted.

When an YES determination is made at step S1304, the control unit 100F saves event recording data in the recording unit 11 and transmits event detection information to another external device (step S1305). The control unit 100F then goes to step S1306.

Figure 21:
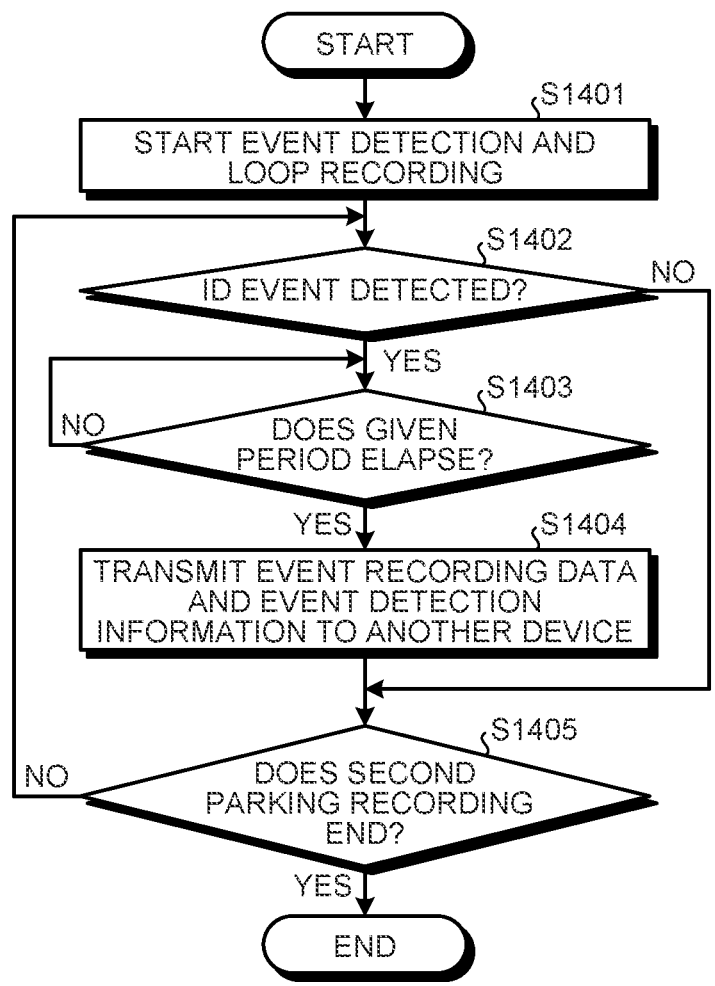
FIG. 21 is a flowchart illustrating an example of a flow of a process of second parking recording according to the ninth embodiment of the disclosure.

Using FIG. 21, a process of second parking recording according to the ninth embodiment of the disclosure will be described. FIG. 21 is a flowchart illustrating an example of a flow of the process of second parking recording according to the ninth embodiment of the disclosure.

The processes of steps S1401 to S1403 and step S1405 are the same as the processes of steps S301 to S303 and step S305 illustrated in FIG. 4, respectively, and thus description thereof is omitted.

When an YES determination is made at step S1403, the control unit 100F transmits event recording data and event detection information to another external device (step S1404). The control unit 100F then goes to step S1405.

As described above, in the first parking recording and the second parking recording in the embodiment, it is possible to transmit event detection information to another device. This makes it possible to appropriately know that the event recording data is recorded. As a result, the user, or the like, is able to appropriately deal with an event that has occurred based on the event detection information.

TENTH EMBODIMENT

Figure 22:
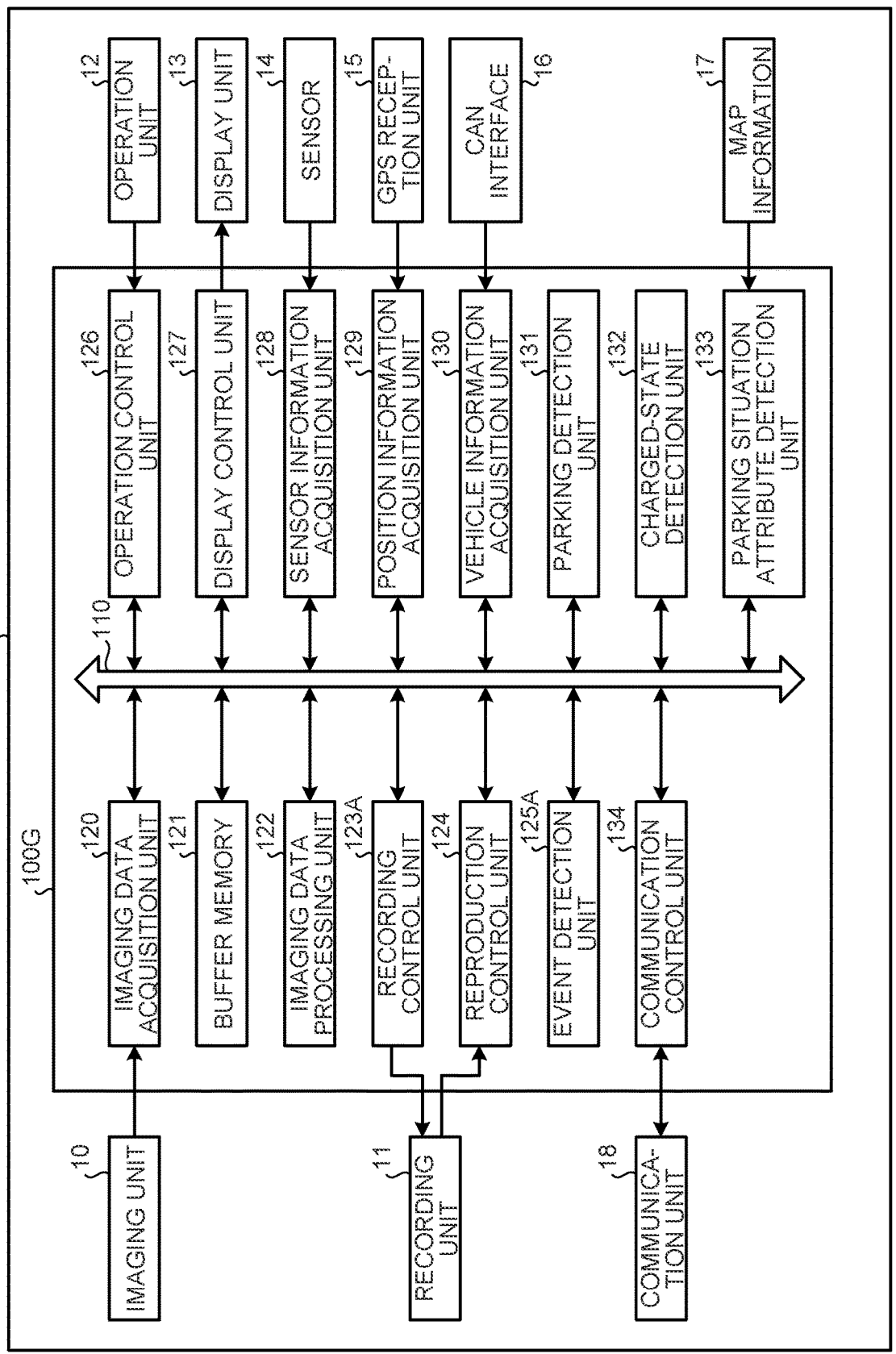
FIG. 22 is a block diagram illustrating an example of a configuration of a recording apparatus according to a tenth embodiment of the disclosure.

Using FIG. 22, a recording apparatus according to a tenth embodiment of the disclosure will be described. FIG. 22 is a block diagram illustrating an example of a configuration of the recording apparatus.

A recording apparatus 1G is different from the recording apparatus 1 illustrated in FIG. 1 in that a control unit 100G includes the parking situation attribute detection unit 133.

Process of Tenth Embodiment

Using FIG. 23, a process of second parking recording according to the tenth embodiment will be described. FIG. 23 is a flowchart illustrating an example of a flow of the process of second parking recording according to the tenth embodiment.

The processes of steps S1501 to S1503 and step S1507 are the same as the processes of steps S301 to S303 and step S305 illustrated in FIG. 4, respectively, and thus description thereof is omitted.

When an YES determination is made at step S1503, the control unit 100F determines whether the current parking situation has the first attribute (step S1504). When it is determined that it has the first attribute (YES at step S1504), the control unit 100F goes to step S1505. When it is determined that it does not have the first attribute (NO at step S1504), the control unit 100F goes to step S1506.

When an YES determination is made at step S1503, the control unit 100F transmits event recording data and event detection information to another external device (step S1505). The control unit 100F then goes to step S1507.

When a NO determination is made at step S1507, the control unit 100F saves event recording data in the recording unit 11 and transmits event detection information to another device (step S1506). The control unit 100F then goes to step S1507.

As described, in the embodiment, it is possible to switch the process of saving event recording data according to whether the parking situation has the first attribute, for example, whether the parking position is a regular parking space. Specifically, when the parking position is a regular parking position, event recording data and event detection information are transmitted to another device. When the parking position is an irregular parking position, event recording data is saved in the recording unit 11 and event detection information is transmitted to another device. Thus, in the regular parking position, such as home, it is possible to appropriately deal with an event having occurred by checking another device that the user owns. When it is an irregular parking position, because the event recording data is recorded in the storage and it is possible check the event having occurred when baking to the vehicle, it is possible to appropriately deal with the event having occurred.

The embodiments of the disclosure have been described, and the content of the embodiments does not limit embodiments. The components described above contain ones easily assumed by those skilled in the art and ones substantially the same, that is, ones in the range of equivalence. Furthermore, the above-described components can be combined as appropriate. Furthermore, various omissions, replacements and changes can be made on the components within the scope of the embodiments described above.

The recording apparatuses, recording control methods, and programs according to the embodiments of the disclosure, for example, are applicable to dashboard cameras.

The computer program for performing the recording control described above may be provided by being stored in a non-transitory computer-readable storage medium, or may be provided via a network such as the Internet. Examples of the computer-readable storage medium include optical discs such as a digital versatile disc (DVD) and a compact disc (CD), and other types of storage devices such as a hard disk and a semiconductor memory.

According to at least one of the embodiments described above, it is possible to record a video appropriately while the vehicle is parked.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A recording control device comprising:
an imaging data acquisition unit configured to acquire imaging data from a camera configured to capture an image of surroundings of a vehicle;
a parking detection unit configured to detect that the vehicle is parked;
an event detection unit configured to detect an event related to the vehicle;
a power supply state detection unit configured to detect a state of a power supply of the vehicle; and
a recording control unit configured to, based on determining that the vehicle is parked, and based on the state of the power supply of the vehicle, switch between first parking recording and second parking recording to be executed, the first parking recording being of starting recording the imaging data in response to the event detection unit detecting the event, the second parking recording being of keeping recording the imaging data,
wherein the power supply state detection unit is a power consumption tendency information acquisition unit configured to acquire information indicating a tendency of power consumption of the vehicle per unit distance based on a travel history of the vehicle,
wherein the tendency of power consumption contains information indicating that a first average power consumption per unit distance in a period of the travel history before parking has changed with respect to a second average power consumption per unit distance in another period of the travel history, and
wherein the recording control unit is configured to, based on determining that the vehicle is parked, perform the first parking recording based on determining, during a first instance, that the first average power consumption per unit distance in the period of the travel history before parking increases with respect to the second average power consumption per unit distance in the other period of the travel history, and perform the second parking recording based on determining, during a second instance, that the first average power consumption per unit distance in the period of the travel history before parking is not increased with respect to the second average power consumption per unit distance in the other period of the travel history.

2. A recording control method executed by a recording control device, the recording control method comprising:
detecting that a vehicle is parked;
detecting a state of a power supply of the vehicle; and
switching, based on determining that the vehicle is parked, and based on the state of the power supply of the vehicle, between first parking recording and second parking recording to be executed, the first parking recording being of starting recording the imaging data in response to detection of detecting an event related to the vehicle, the second parking recording being of keeping recording the imaging data,
wherein the detecting of the state of the power supply of the vehicle comprises acquiring information indicating a tendency of power consumption of the vehicle per unit distance based on a travel history of the vehicle,
wherein the tendency of power consumption contains information indicating that a first average power consumption per unit distance in a period of the travel history before parking has changed with respect to a second average power consumption per unit distance in another period of the travel history, and
wherein the switching between the first parking recording and the second parking recording comprises, based on determining that the vehicle is parked, performing the first parking recording based on determining, during a first instance, that the first average power consumption per unit distance in the period of the travel history before parking increases with respect to the second average power consumption per unit distance in the other period of the travel history, and performing the second parking recording based on determining, during a second instance, that the first average power consumption per unit distance in the period of the travel history before parking is not increased with respect to the second average power consumption per unit distance in the other period of the travel history.

3. A non-transitory computer-readable storage medium containing a computer program causing a computer operating as a recording control device to execute:
detecting that a vehicle is parked;
detecting a state of a power supply of the vehicle; and
switching, based on determining that the vehicle is parked, and based on the state of the power supply of the vehicle, between first parking recording and second parking recording to be executed, the first parking recording being of starting recording the imaging data in response to detecting an event related to the vehicle, the second parking recording being of keeping recording the imaging data,
wherein the detecting of the state of the power supply of the vehicle comprises acquiring information indicating a tendency of power consumption of the vehicle per unit distance based on a travel history of the vehicle,
wherein the tendency of power consumption contains information indicating that a first average power consumption per unit distance in a period of the travel history before parking has changed with respect to a second average power consumption per unit distance in another period of the travel history, and
wherein the switching between the first parking recording and the second parking recording comprises, based on determining that the vehicle is parked, performing the first parking recording based on determining, during a first instance, that the first average power consumption per unit distance in the period of the travel history before parking increases with respect to the second average power consumption per unit distance in the other period of the travel history, and performing the second parking recording based on determining, during a second instance, that the first average power consumption per unit distance in the period of the travel history before parking is not increased with respect to the second average power consumption per unit distance in the other period of the travel history.

* * * * *